(12) United States Patent
Kim et al.

(10) Patent No.: US 11,914,181 B2
(45) Date of Patent: Feb. 27, 2024

(54) OPTICAL FILTER AND SPECTROMETER INCLUDING THE SAME

(71) Applicant: SAMSUNG ELECTRONICS CO., LTD., Suwon-si (KR)

(72) Inventors: Hyochul Kim, Yongin-si (KR); Younggeun Roh, Seoul (KR); Yeonsang Park, Seoul (KR); Jaesoong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 357 days.

(21) Appl. No.: 17/132,200

(22) Filed: Dec. 23, 2020

(65) Prior Publication Data

US 2021/0318477 A1 Oct. 14, 2021

(30) Foreign Application Priority Data

Apr. 8, 2020 (KR) .................. 10-2020-0042970
Jun. 26, 2020 (KR) .................. 10-2020-0078814

(51) Int. Cl.
*G02B 5/28* (2006.01)
*G01J 3/28* (2006.01)
*G02B 5/20* (2006.01)

(52) U.S. Cl.
CPC ............. *G02B 5/288* (2013.01); *G01J 3/28* (2013.01); *G02B 5/201* (2013.01); *G02B 5/28* (2013.01)

(58) Field of Classification Search
CPC .......... G02B 5/288; G02B 5/201; G02B 5/28; G02B 5/284; G02B 5/20; G01J 3/28; G01J 2003/1226; G01J 3/26; G01J 3/12

(Continued)

(56) References Cited

U.S. PATENT DOCUMENTS 5,726,805 A 3/1998 Kaushik et al.
8,492,863 B2 7/2013 Cho et al.
(Continued)

FOREIGN PATENT DOCUMENTS

EP 3 546 903 A2 10/2019
EP 3 771 892 A1 2/2021
(Continued)

OTHER PUBLICATIONS

Communication dated Aug. 11, 2021, from the European Patent Office in European Application No. 21166500.5.

(Continued)

*Primary Examiner* — Md M Rahman
(74) *Attorney, Agent, or Firm* — Sughrue Mion, PLLC

(57) ABSTRACT

Provided are an optical filter and a spectrometer including the optical filter. The optical filter includes at least one first filter element having a first center wavelength of a first wavelength band, and at least one second filter element arranged on a same plane as the at least one first filter element, the at least one second filter element having a second center wavelength of a second wavelength band. The at least one first filter element includes a first bandpass filter including a plurality of first Bragg reflective layers and at least one first cavity provided between the plurality of first Bragg reflective layers, and a first multi-layer provided on the first bandpass filter, the first multi-layer having a center wavelength different than the first center wavelength of the first Bragg reflective layers in order to block light of a wavelength band other than the first wavelength band.

36 Claims, 40 Drawing Sheets

(58) Field of Classification Search
USPC .......................................................... 356/326
See application file for complete search history.

(56) References Cited

U.S. PATENT DOCUMENTS

| | | |
|---|---|---|
| 2015/0144770 A1 | 5/2015 | Choi |
| 2018/0247965 A1 | 8/2018 | Ockenfuss |
| 2019/0004222 A1 | 1/2019 | Hwang et al. |
| 2019/0187347 A1 | 6/2019 | Bilger et al. |
| 2020/0109991 A1 | 4/2020 | Tack et al. |
| 2021/0033466 A1 | 2/2021 | Kim et al. |

FOREIGN PATENT DOCUMENTS

| | | |
|---|---|---|
| KR | 10-0734565 B1 | 7/2007 |
| KR | 10-1638973 B1 | 7/2016 |
| KR | 10-2018-0015067 A | 2/2018 |
| KR | 10-2021-0014491 A | 2/2021 |

OTHER PUBLICATIONS

Dai et al., "Design and fabrication of UV band-pass filters based on $SiO_2/Si_3N_4$ dielectric distributed bragg reflectors," Elsevier, Applied Surface Science, vol. 364, 2016, pp. 886-891 (published Dec. 30, 2015).

Etebari, "Designing of a linear variable optical filter with narrow bandpass," International Journal of Engineering Research and Applications (IJERA), vol. 3, Issue 2, Mar.-Apr. 2013, pp. 1552-1556.

OPTICAL FILTER AND SPECTROMETER INCLUDING THE SAME

CROSS-REFERENCE TO RELATED APPLICATIONS

This application is based on and claims priority to Korean Patent Application No. 10-2020-0042970, filed on Apr. 8, 2020, and Korean Patent Application No. 10-2020-0078814, filed on Jun. 26, 2020, in the Korean Intellectual Property Office, the disclosures of which are incorporated herein in their entirety by reference.

BACKGROUND

1. Field

The disclosure relates to optical filters and spectrometers including the optical filters.

2. Description of Related Art

A spectrometer is one of the significant optical devices in the field of optics. However, because a spectrometer according to the related art includes various optical devices, the spectrometer is bulky and heavy. Recently, there has been a demand to reduce the size of the spectrometer, and accordingly, research into simultaneous implementation of an integrated circuit and an optical device on a semiconductor chip has been conducted.

SUMMARY

Provided are optical filters and spectrometers including the optical filters.

Additional aspects will be set forth in part in the description which follows and, in part, will be apparent from the description, or may be learned by practice of the presented embodiments of the disclosure.

According to an aspect of the disclosure, there is provided an optical filter comprising: at least one first filter element having a first center wavelength within a first wavelength band; and at least one second filter element arranged on a same plane as the at least one first filter element, the at least one second filter element having a second center wavelength within a second wavelength band, wherein each of the at least one first filter element comprises: a first bandpass filter including a plurality of first Bragg reflective layers and at least one first cavity provided between the plurality of first Bragg reflective layers; and a first multi-layer provided on the first bandpass filter, the first multi-layer having a different center wavelength than the first center wavelength of the plurality of first Bragg reflective layers to block light of other wavelength bands than the first wavelength band.

Each of the plurality of first Bragg reflective layers and the first multi-layer may have a structure, in which a plurality of material layers having different refractive indices from one another are alternately stacked, wherein each of the plurality of material layers in the first multi-layer may have a first thickness and may be made of a first material, and wherein at least one of the first thickness or the first material may be different from a second thickness or a second material of each of the plurality of material layers of the plurality of first Bragg reflective layers.

The first multi-layer may include a third Bragg reflective layer including material layers having identical optical thicknesses.

The first multi-layer may include a first pass filter including material layers, at least some of which have different optical thicknesses.

The first pass filter may include a shortpass filter.

The first center wavelength of the first bandpass filter may be adjusted by changing a thickness or an effective refractive index of the at least one first cavity.

The at least one second filter element may comprise: a second bandpass filter including a plurality of second Bragg reflective layers and a second cavity between the plurality of second Bragg reflective layers; and a second multi-layer provided on the second bandpass filter, the second multi-layer having a different center wavelength than the second center wavelength of the plurality of second Bragg reflective layers to block light of other wavelength bands than the second wavelength band.

Each of the plurality of second Bragg reflective layers and the second multi-layer may have a structure, in which a plurality of material layers having different refractive indices from one another are alternately stacked, wherein the plurality of material layers in the second multi-layer may have a third thickness and may be made of a third material, and wherein at least one of the third thickness or the third material may be different from a fourth thickness or a fourth material of each of the plurality of material layers of the plurality of second Bragg reflective layers.

The material layers in each of the second Bragg reflective layers may be same as the material layers in the first multi-layer, and the material layers in the second multi-layer may be same as material layers in each of the first Bragg reflective layers.

The second multi-layer may include a fourth Bragg reflective layer including material layers having identical optical thicknesses.

The second multi-layer may include a second pass filter including material layers, at least some of which have different optical thicknesses.

The second pass filter may include a longpass filter.

The second center wavelength of the second bandpass filter may be adjusted by changing a thickness or an effective refractive index of the second cavity.

The at least one second filter element may comprise a second bandpass filter that includes a plurality of second Bragg reflective layers including a material absorbing the light of the first wavelength band and a cavity provided between the plurality of second Bragg reflective layers.

The optical filter may further comprise at least one third filter element arranged on a same plane as the at least one first filter element and the at least one second filter element, wherein the at least one third filter element has a third center wavelength between the first wavelength band and the second wavelength band.

The optical filter may further comprise an additional filter provided on the at least one first filter element and the at least one second filter element to only transmit a certain wavelength band.

The additional filter may comprise a color filter or a wideband filter.

The optical filter may further comprise a short-wavelength absorption filter is provided on some of the at least one first filter element and the at least one second filter element and a long-wavelength block filter is provided on some of the other of the at least one first filter element and the at least one second filter element.

According to another aspect of the disclosure, there is provided an optical filter comprising: a plurality of filter elements arranged on a same plane, the plurality of filter elements having center wavelengths in different wavelength bands, wherein each of the plurality of filter elements comprises: a plurality of material layers having refractive indices different from one another; and a cavity provided between the plurality of material layers, wherein the plurality of material layers have gradually increasing thicknesses that are gradually in a first direction.

The center wavelengths of the plurality of filter elements may be adjusted by changing a location of the cavity of the respective one of the plurality of filter elements.

According to another aspect of the disclosure, there is provided a spectrometer comprising: an optical filter; and a sensing device receiving light transmitted through the optical filter, wherein the optical filter comprises: at least one first filter element having a first center wavelength within a first wavelength band; and at least one second filter element arranged on a same plane as the at least one first filter element, the at least one second filter element having a second center wavelength within a second wavelength band, the at least one first filter element comprises: a first bandpass filter including a plurality of first Bragg reflective layers and at least one first cavity provided between the plurality of first Bragg reflective layers; and a first multi-layer provided on the first bandpass filter, the first multi-layer having a different center wavelength than the first center wavelength of the plurality of first Bragg reflective layers to block light of other wavelength bands than the first wavelength band.

Each of the plurality of first Bragg reflective layers and the first multi-layer may have a structure, in which a plurality of material layers having different refractive indices from one another are alternately stacked, wherein each of the plurality of material layers in the first multi-layer may have a first thickness and may be made of a first material, and wherein at least one of the first thickness or the first material may be different from a second thickness or a second material of each of the plurality of material layers of the plurality of first Bragg reflective layers.

The first multi-layer may include a third Bragg reflective layer including material layers having identical optical thicknesses.

The first multi-layer may include a first pass filter including material layers, at least some of which have different optical thicknesses.

The first center wavelength of the first bandpass filter may be adjusted by changing a thickness or an effective refractive index of the at least one first cavity.

The at least one second filter element may comprise: a second bandpass filter including a plurality of second Bragg reflective layers and a second cavity between the plurality of second Bragg reflective layers; and a second multi-layer provided on the second bandpass filter, the second multi-layer having a different center wavelength than the second center wavelength of the plurality of second Bragg reflective layers to block light of other wavelength bands than the second wavelength band.

Each of the plurality of second Bragg reflective layers and the second multi-layer may have a structure, in which a plurality of material layers having different refractive indices from one another are alternately stacked, wherein the plurality of material layers in the second multi-layer may have a third thickness and is made of a third material, and wherein at least one of the third thickness or the third material is different from a fourth thickness or a fourth material of each of the plurality of material layers of the plurality of second Bragg reflective layers.

The second multi-layer may include a fourth Bragg reflective layer including material layers having identical optical thicknesses.

The second multi-layer may include a first pass filter including material layers, at least some of which have different optical thicknesses.

The second center wavelength of the second bandpass filter may be adjusted by changing a thickness or an effective refractive index of the second cavity.

The at least one second filter element may comprise a second bandpass filter that includes a plurality of second Bragg reflective layers including a material absorbing the light of the first wavelength band and a cavity provided between the plurality of second Bragg reflective layers.

The optical filter may further comprise at least one third filter element arranged on a same plane as the at least one first filter element and the at least one second filter element, and the at least one third filter element may have a third center wavelength between the first wavelength band and the second wavelength band.

The optical filter further may comprise an additional filter provided on the at least one first filter element and the at least one second filter element to only transmit a certain wavelength band.

The spectrometer may further comprise a short-wavelength absorption filter provided on some of the at least one first filter element and the at least one second filter element and a long-wavelength block filter is provided on some of the other of the at least one first filter element and the at least one second filter element.

According to another aspect of the disclosure, there is provided an optical filter comprising: a first bandpass filter having a first center wavelength within a first wavelength band, the first bandpass filter including a plurality of first Bragg reflective layers and at least one first cavity provided between the plurality of first Bragg reflective layers; a first multi-layer provided on the first bandpass filter, the first multi-layer having a plurality of first material layers configured to block light of wavelength bands different from the first wavelength band; a second bandpass filter having a second center wavelength within a second wavelength band, the second bandpass filter including a plurality of second Bragg reflective layers and at least one second cavity provided between the plurality of second Bragg reflective layers; and a second multi-layer provided on the second bandpass filter, the second multi-layer having a plurality of second material layers configured to block light of wavelength bands different from the second wavelength band, wherein the first bandpass filter and the first multi-layer are provided on a same plane as the second bandpass filter and the second multi-layer.

According to another aspect of the disclosure, there is provided an optical filter comprising: a first filter group comprising: a plurality of first bandpass filters; and a plurality of first multi-layers provided on the plurality of first bandpass filters; and a second filter group comprising: a plurality of second bandpass filters; and a plurality of second multi-layers provided on the second bandpass filters, wherein the plurality of first bandpass filters comprises: a first first bandpass filter having a first center wavelength within a first wavelength band, and a second first bandpass filter having a second center wavelength within a first wavelength band, and wherein the plurality of first multi-layers is configured to block light of wavelength bands different from the first wavelength band.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
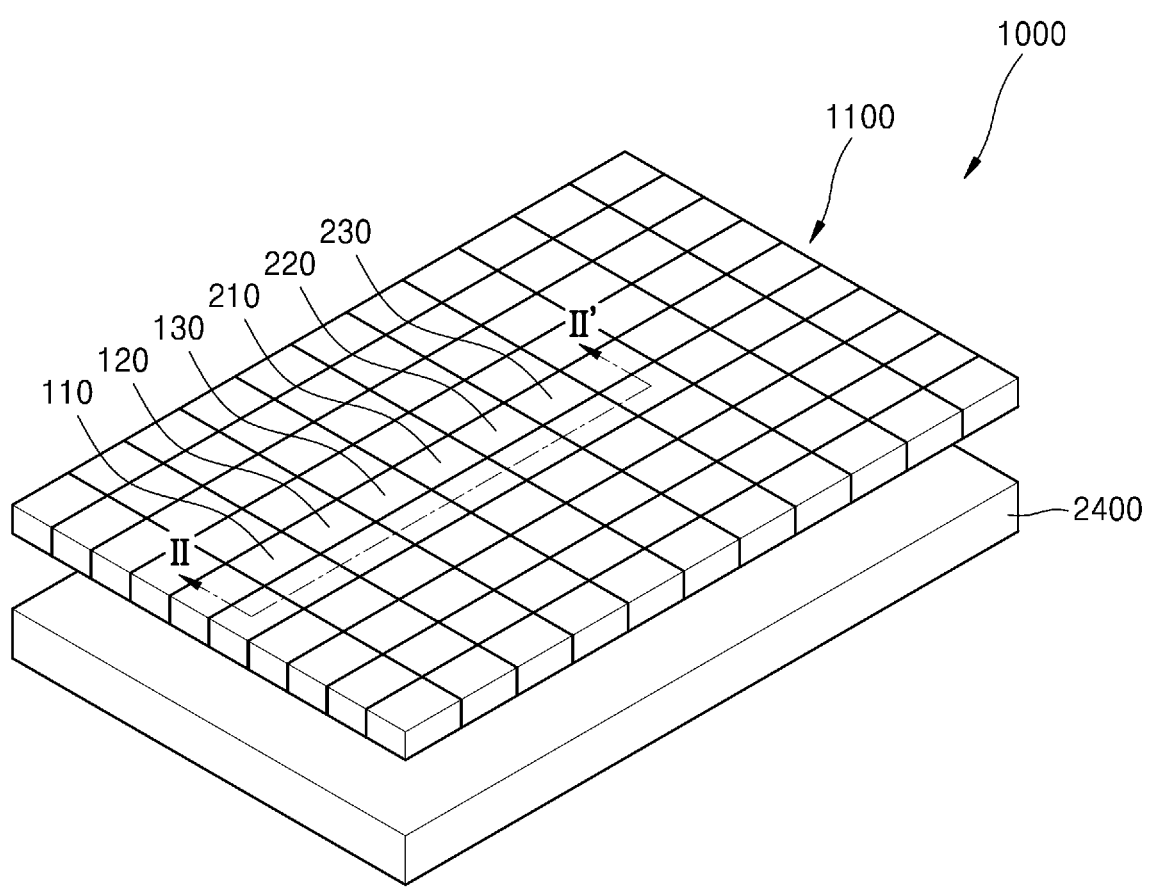
FIG. 1 is a perspective view of a spectrometer according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, one or more example embodiments of the disclosure will be described in detail with reference to accompanying drawings. In the drawings, like reference numerals denote like components, and sizes of components in the drawings may be exaggerated for convenience of explanation. The embodiments of the disclosure are capable of various modifications and may be embodied in many different forms.

When a layer, a film, a region, or a panel is referred to as being "on" another element, it may be directly on the other layer or substrate, or intervening layers may also be present. An expression used in the singular encompasses the expression of the plural, unless it has a clearly different meaning in the context. Throughout the specification, when a portion "includes" an element, another element may be further included, rather than excluding the existence of the other element, unless otherwise described.

As used herein, in particular, terms such as "the" and demonstratives similar thereto used herein may be to indicate both the singular and the plural. Also, the steps of all methods described herein may be performed in any suitable order unless otherwise indicated herein or otherwise clearly contradicted by context.

In addition, the terms such as " . . . unit", "module", etc. provided herein indicates a unit performing at least one function or operation, and may be realized by hardware, software, or a combination of hardware and software.

Furthermore, the connecting lines or connectors shown in the drawings are intended to represent example functional relationships and/or physical or logical couplings between the various elements. It should be noted that many alternative or additional functional relationships, physical connections, or logical connections may be present in a practical device.

The use of any and all examples, or example language provided herein, is intended merely to better illuminate the present disclosure and does not pose a limitation on the scope of the present disclosure unless otherwise claimed.

Figure 2:
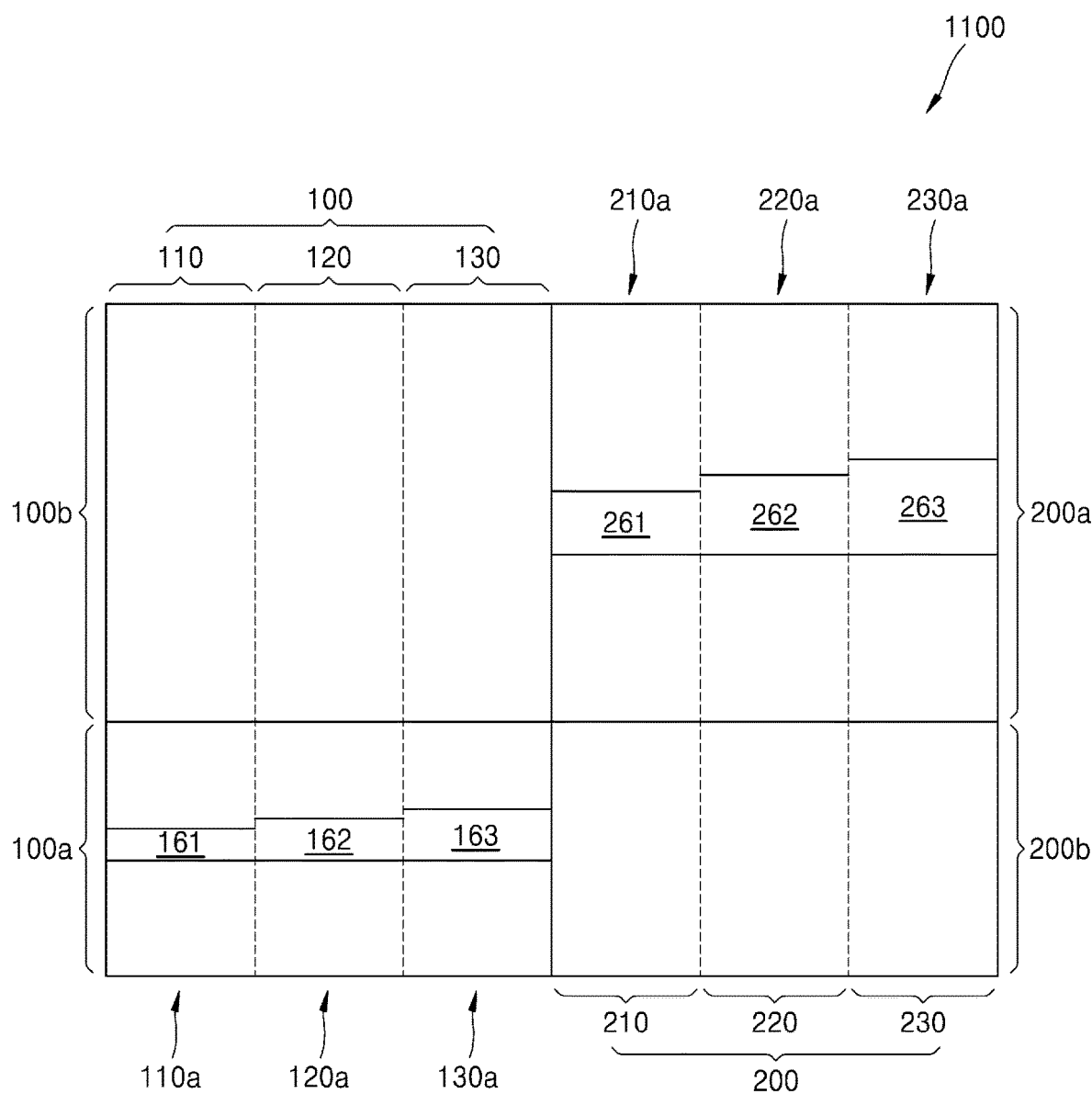
FIG. 2 is a cross-sectional view of an optical filter taken along line II-II' of FIG. 1.

FIG. 1 is a perspective view of a spectrometer 1000 according to an example embodiment. FIG. 2 is a cross-sectional view of an optical filter 1100 taken along line II-II' of FIG. 1.

Referring to FIG. 1 and FIG. 2, the spectrometer 1000 includes a sensing device 2400 and an optical filter 1100 provided on the sensing device 2400. The optical filter 1100 may include a plurality of filter units arranged two-dimensionally. However, one or more embodiments are not limited thereto, and the plurality of filter units may be arranged one-dimensionally. FIG. 2 exemplarily shows cross-sections of six filter units 110, 120, 130, 210, 220, and 230.

The sensing device 2400 may receive light that has passed through the optical filter 1100 and convert the light into an electric signal. The light passing through the optical filter 1100 reaches pixels of the sensing device 2400. The sensing device 2400 converts the light incident to the pixels into electric signals to perform spectroscopy on the light incident to the optical filter 1100. The sensing device 2400 may include, for example, an image sensor such as a charge coupled device (CCD), a complementary metal oxide semiconductor (CMOS) image sensor, etc., or a photodiode. However, one or more example embodiments are not limited thereto.

The optical filter 1100 may include first and second filter groups 100 and 200 on the same plane. Here, the first filter group 100 may include first to third filter units 110, 120, and 130, and the second filter group 200 may include fourth to sixth filter units 210, 220, and 230. However, one or more example embodiments of the disclosure are not limited thereto, and the number of filter units included in each of the first and second filter groups 100 and 200 may vary.

The first filter group 100 may include a first bandpass filter group 100a and a first multi-layer 100b on the first bandpass filter group 100a. The first bandpass filter group 100a may have center wavelengths within a first wavelength band (e.g., about 400 nm to 550 nm), and the first multi-layer 100b may block light of other wavelength bands than the first wavelength band.

Figure 3:
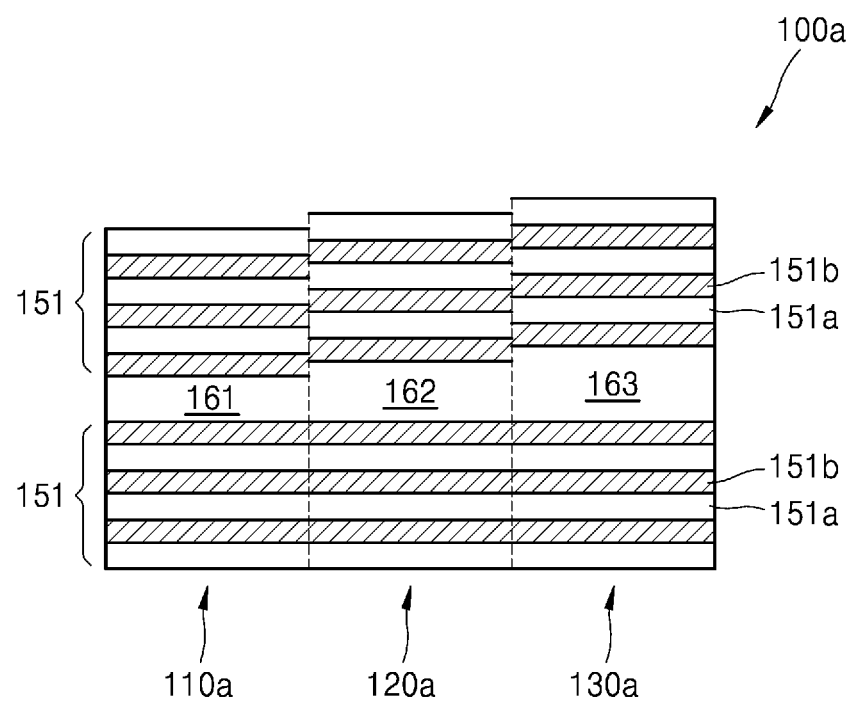
FIG. 3 is a cross-sectional view of a first bandpass filter group of FIG. 2.
Figure 4:
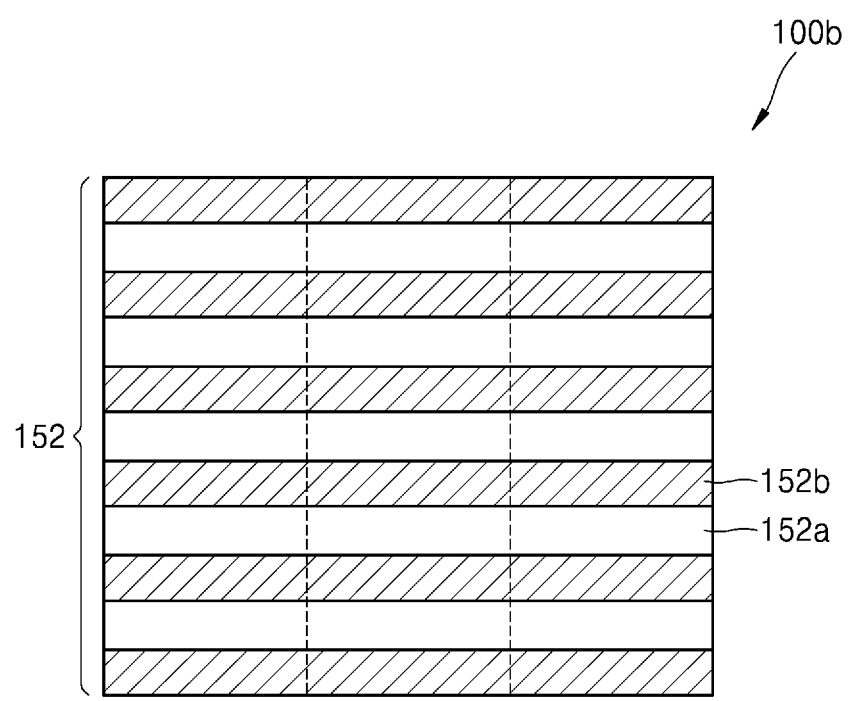
FIG. 4 is a cross-sectional view showing an example of a first multi-layer of FIG. 2.

FIG. 3 shows a cross-section of the first bandpass filter group 100a, and FIG. 4 shows an example of the first multi-layer 100b.

Referring to FIGS. 3 and 4, the first bandpass filter group 100a may include first to third bandpass filters 110a, 120a, and 130a having center wavelengths different from one another within the first wavelength band (e.g., about 400 nm to about 550 nm). The first bandpass filter 110a and the first multi-layer 100b may form the first filter unit 110, the second bandpass filter 120a and the first multi-layer 100b may form the second filter unit 120, and the third bandpass filter 130a and the first multi-layer 100b may form the third filter unit 130.

Each bandpass filter transmits a wavelength band including a certain center wavelength, and has a Fabry-Perot structure, in which a cavity is provided between two reflective layers. A center wavelength and a wavelength band of the light passing through the bandpass filter may be determined according to reflection bands of the reflective layers and characteristics of the cavity.

Each of the first to third bandpass filters 110a, 120a, and 130a includes two first Bragg reflective layers 151 and a cavity 161, 162, or 163 between the first Bragg reflective layers 151. The first to third bandpass filters 110a, 120a, and 130a may respectively include first to third cavities 161, 162, and 163. The first Bragg reflective layer 151 may be a distributed Bragg reflector (DBR).

Each of the first Bragg reflective layers 151 may have a structure in which first and second material layers 151a and 151b having different refractive indices are alternately stacked. The first and second material layers 151a and 151b may have the same optical thickness. Here, the optical thickness denotes a thickness reflecting a wavelength and a refractive index of incident light in addition to a physical thickness. Hereinafter, the term 'thickness' denotes a physical thickness.

For example, the first and second material layers 151a and 151b may include silicon oxide and titanium oxide. In another example, the first and second material layers 151a and 151b may include silicon oxide and silicon. However, one or more example embodiments are not limited thereto, and the first and second material layers 151a and 151b may include other various materials. Silicon may have a refractive index of about 3.0 or greater, silicon oxide may have a refractive index of about 1.4 to 1.5, and titanium oxide may have a refractive index of about 1.9 to 3.0.

The cavities 161, 162, and 163 between the first Bragg reflective layers 151 may include a dielectric material having a certain refractive index as a resonant layer. For example, the cavities 161, 162, and 163 may include silicon, silicon oxide, or titanium oxide. When the light is incident into the first to third cavities 161, 162, and 163 after passing through the first Bragg reflective layer 151, the light reciprocates in the first to third cavities 161, 162, and 163 between the first Bragg reflective layers 151 and causes constructive interference and destructive interference. In addition, the light having a certain center wavelength that satisfies the constructive interference condition is output from the first to third bandpass filters 110a, 120a, and 130a.

The first cavity 161 may have a thickness that is less than that of the second cavity 162, and the third cavity 163 may have a thickness that is greater than that of the second cavity 162. Accordingly, the first bandpass filter 110a may have a first center wavelength that is less than a second center wavelength of the second bandpass filter 120a, and the third bandpass filter 130a may have a third center wavelength that is greater than the second wavelength of the second bandpass filter 120a.

The first multi-layer 100b is on the first bandpass filter group 100a. Here, the first multi-layer 100b may be the second Bragg reflective layer 152. The second Bragg reflective layer 152 may include a DBR like the first Bragg reflective layer 151. Here, the second Bragg reflective layer 152 may have a reflective wavelength band that is different from that of the first Bragg reflective layer 151.

The second Bragg reflective layer 152 may have a structure in which third and fourth material layers 152a and 152b having different refractive indices are alternately stacked. Here, the third and fourth material layers 152a and 152b may have an equal optical thickness.

The third and fourth material layers 152a and 152b may include the same material as that of the first and second material layers 151a and 151b, but are not limited thereto. For example, the third and fourth material layers 152a and 152b may include silicon oxide and titanium oxide. In another example, the third and fourth material layers 152a and 152b may include silicon oxide and silicon. However, one or more example embodiments are not limited thereto, and the third and fourth material layers 152a and 152b may include other various materials.

At least one of the material and thickness of the third and fourth material layers 152a and 152b may be different from at least one of the material and thickness of the first and second material layers 151a and 151b, such that the second Bragg reflective layer 152 may have a different reflective wavelength band from a reflective wavelength band of the first Bragg reflective layer 151. For example, when the third and fourth material layers 152a and 152b are the same as the first and second material layers 151a and 151b, the third and fourth material layers 152a and 152b may have a different thickness from that of the first and second material layers 151a and 151b. FIG. 4 shows an example, in which the third and fourth material layers 152a and 152b have thicknesses that are greater than those of the first and second material layers 151a and 151b.

The third and fourth material layers 152a and 152b may include a different material from that of the first and second material layers 151a and 151b. In this case, the third and fourth material layers 152a and 152b may have thicknesses that are the same as or different from those of the first and second material layers 151a and 151b.

Figure 5:
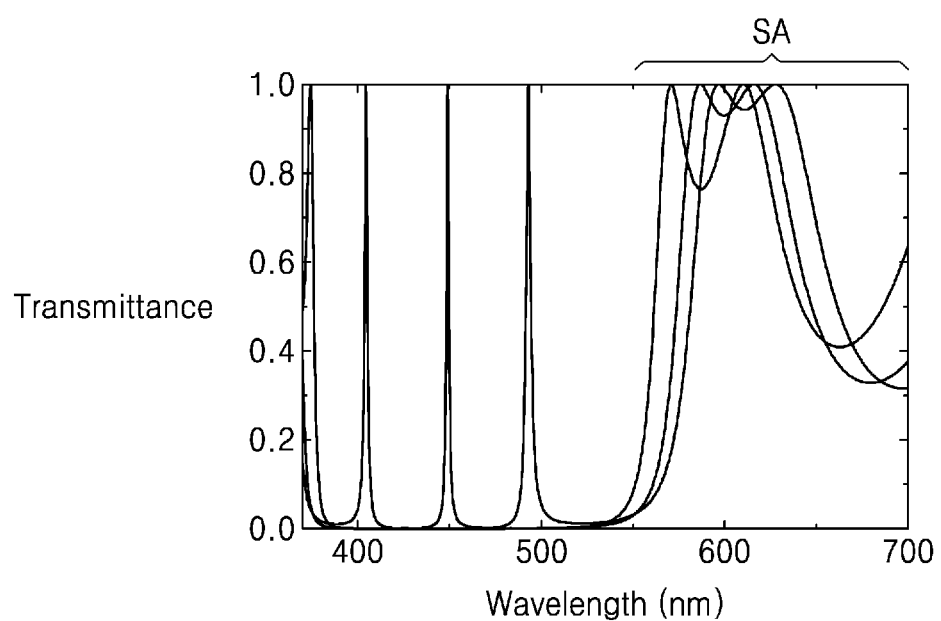
FIG. 5 is a diagram showing an example of a transmission spectrum of the first bandpass filter group of FIG. 3.

FIG. 5 is a diagram showing an example of a transmission spectrum of the first bandpass filter group 100a of FIG. 3. Referring to FIG. 5, the first bandpass filter group 100a transmits light of an undesired wavelength band (SA), as well as the light of the first wavelength band (about 400 nm to about 550 nm).

Figure 6:
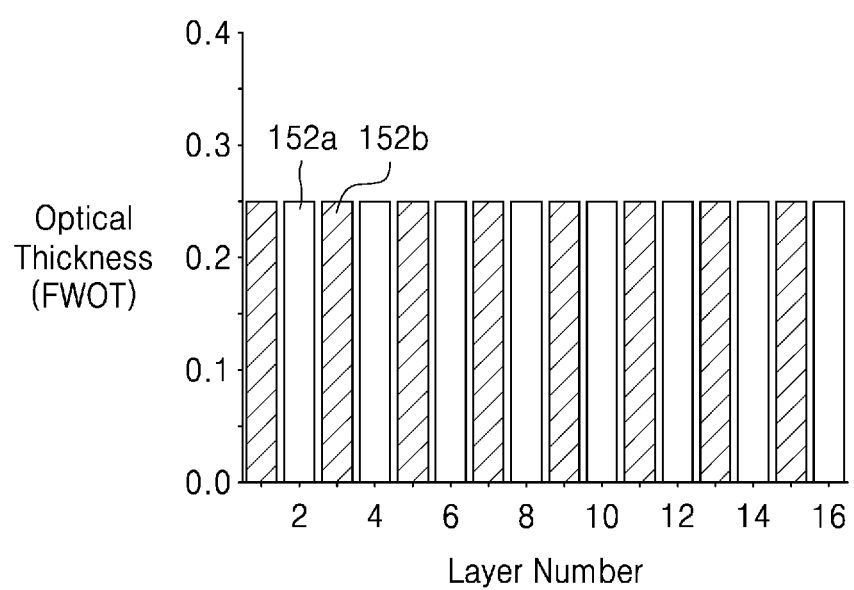
FIG. 6 is a diagram showing optical thicknesses of material layers constituting a second Bragg reflective layer of FIG. 4.

FIG. 6 shows the optical thickness of the third and fourth material layers 152a and 152b included in the second Bragg reflective layer 152 of FIG. 4. In FIG. 6, the acronym full wave optical thickness (FWOT) denotes an optical thickness and may be defined by "(thickness×refractive index)/wavelength of incident light." Here, the wavelength of the incident light denotes a center wavelength of a photonic bandgap blocked by the second Bragg reflective layer.

Referring to FIG. 6, the third and fourth material layers 152a and 152b included in the second Bragg reflective layer 152 have an equal optical thickness. The optical thicknesses (FWOT) of the third and fourth material layers 152a and 152b may be about, for example, 0.25.

Figure 7:
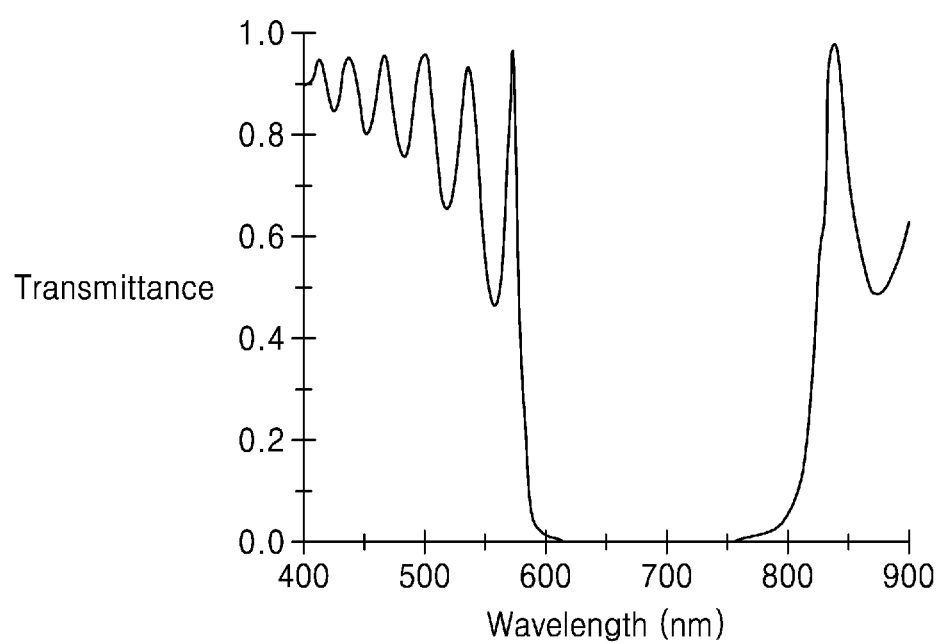
FIG. 7 is a diagram showing an example of a transmission spectrum of the second Bragg reflective layer of FIG. 6.

FIG. 7 is a diagram showing an example of a transmission spectrum of the second Bragg reflective layer 152 of FIG. 6. Referring to FIG. 7, the second Bragg reflective layer 152 mostly reflects the light of other wavelength bands than the first wavelength band (about 400 nm to about 550 nm).

Figure 8:
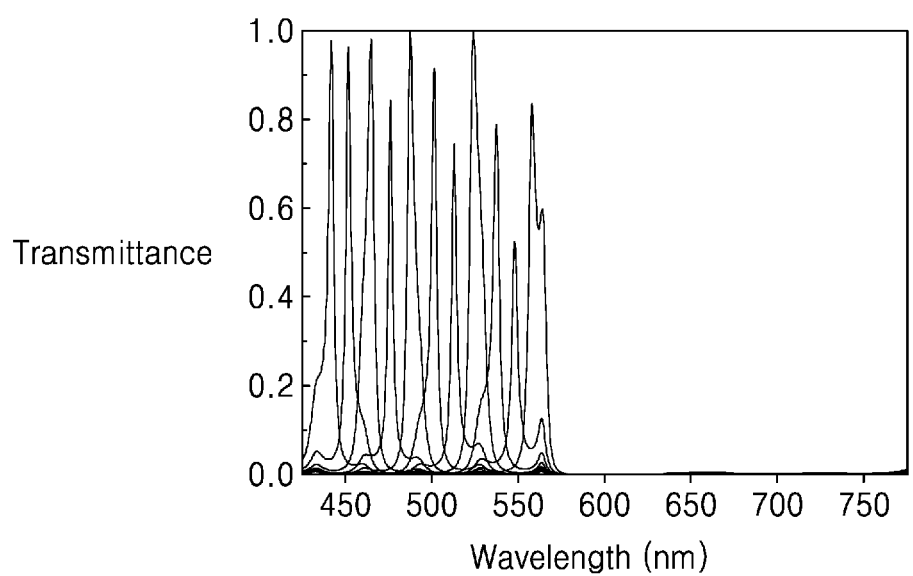
FIG. 8 is a diagram showing an example of a transmission spectrum of a first filter group of FIG. 2.

FIG. 8 is a diagram showing an example of a transmission spectrum of the first filter group 100 of FIG. 2. Referring to FIG. 8, the second Bragg reflective layer 152 on the first bandpass filter group 100a blocks the light of the other wavelength band than the first wavelength band (about 400 nm to about 550 nm), and thus, the first filter group 100 may only transmit the light of the first wavelength band, that is, the desired wavelength band.

In the above description, the first multi-layer 100b is on the first bandpass filter group 100a, but the first multi-layer 100b may be under or below the first bandpass filter group 100a. That is, according to an example embodiment, the first multi-layer 100b may be provided on a top surface of the first bandpass filter group 100a, or the first multi-layer 100b may be provided on a bottom surface of the first bandpass filter group 100a. According to an example embodiment, the first multi-layer 100b may be provided on both a top surface of the first bandpass filter group 100a and a bottom surface of the first bandpass filter group 100a.

The second filter group 200 may include a second multi-layer 200b and a second bandpass filter group 200a on the second multi-layer 200b. The second bandpass filter group 200a may have center wavelengths within a second wavelength band (e.g., about 550 nm to 700 nm), and the second multi-layer 200b may block light of other wavelength bands than the second wavelength band.

Figure 9:
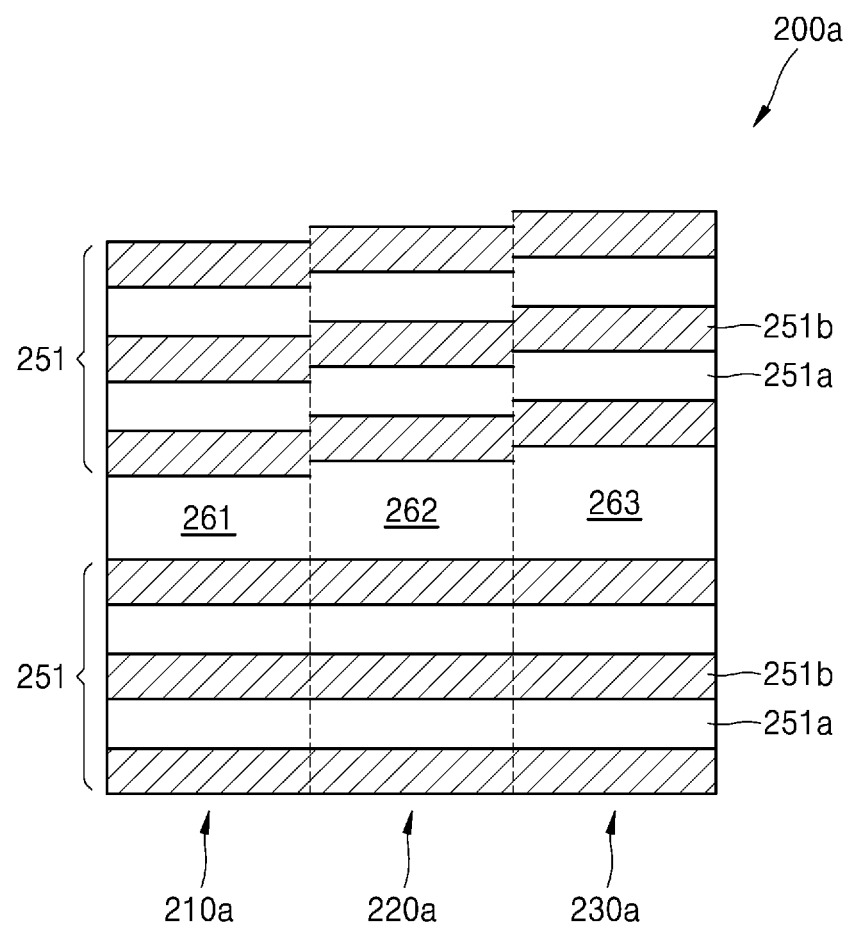
FIG. 9 is a cross-sectional view of a second bandpass filter group of FIG. 2.
Figure 10:
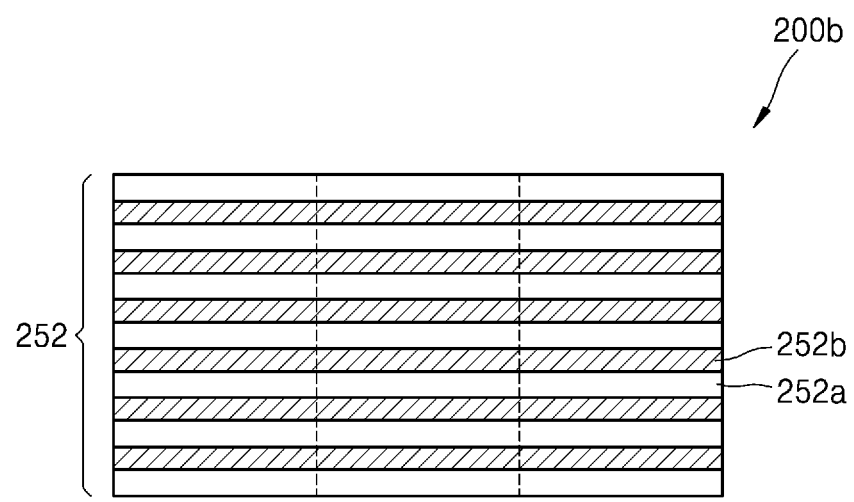
FIG. 10 is a cross-sectional view showing an example of a second multi-layer of FIG. 2.

FIG. 9 shows a cross-section of the second bandpass filter group 200a, and FIG. 10 shows an example of the second multi-layer 200b.

Referring to FIGS. 9 and 10, the second multi-layer 200b may include a first Bragg reflective layer 252. Here, the first Bragg reflective layer 252 may be the same as the first Bragg reflective layer 151 in the first filter group 100, except for the number of layers. The first Bragg reflective layer 252 may have a reflective wavelength band that is different from that of a second Bragg reflective layer 251 that will be described later.

The first Bragg reflective layer 252 may have a structure, in which first and second material layers 252a and 252b having different refractive indices are alternately stacked. Here, the first and second material layers 252a and 252b may have an equal optical thickness.

The second bandpass filter group 200a is on the second multi-layer 200b. The second bandpass filter group 200a may include fourth, fifth, and sixth bandpass filters 210a, 220a, and 230a having different center wavelengths from one another within the second wavelength band (e.g., about 550 nm to about 700 nm). The fourth bandpass filter 210a and the second multi-layer 200b form the fourth filter unit 210, the fifth bandpass filter 220a and the second multi-layer 200b form the fifth filter unit 220, and the sixth bandpass filter 230a and the second multi-layer 200b form the sixth filter unit 230.

Each of the fourth, fifth, and sixth bandpass filters 210a, 220a, and 230a includes two second Bragg reflective layers 251 and a cavity 261, 262, or 263 between the two second Bragg reflective layers 251. Here, the fourth, fifth, and sixth bandpass filters 210a, 220a, and 230a may respectively include the fourth, fifth, and sixth cavities 261, 262, and 263 having different thicknesses. Each of the second Bragg reflective layers 251 may be a DBR.

Each of the second Bragg reflective layers 251 may be the same as the second Bragg reflective layer 152 in the first filter group 100, except for the number of layers. The second Bragg reflective layer 251 may have a structure, in which third and fourth material layers 251a and 251b having different refractive indices are alternately stacked. Here, the third and fourth material layers 251a and 251b may have an equal optical thickness.

At least one of the material and thickness of the third and fourth material layers 251a and 251b may be different from at least one of the material and thickness of the first and second material layers 252a and 252b, such that the second Bragg reflective layer 251 may have a different reflective wavelength band from that of the first Bragg reflective layer 252. For example, when the third and fourth material layers 251a and 251b are the same as the first and second material layers 252a and 252b, the third and fourth material layers 251a and 251b may have thicknesses that are different from those of the first and second material layers 252*a* and 252*b*. FIG. 9 shows an example, in which the third and fourth material layers 251*a* and 251*b* have thicknesses that are greater than those of the first and second material layers 252*a* and 252*b*.

The cavities 261, 262, and 263 between the second Bragg reflective layers 251 may include a dielectric material having a certain refractive index as a resonant layer. For example, the cavities 261, 262, and 263 may include silicon, silicon oxide, or titanium oxide.

The fourth cavity 261 may have a thickness that is less than that of the fifth cavity 262, and the sixth cavity 263 may have a thickness that is greater than the fifth cavity 262. Accordingly, in the second bandpass filter group 200*a*, the fourth bandpass filter 210*a* has a fourth center wavelength that is less than a fifth center wavelength of the fifth bandpass filter 220*a*, and the sixth bandpass filter 230*a* may have a sixth center wavelength that is greater than the fifth center wavelength of the fifth bandpass filter 220*a*.

Figure 11:
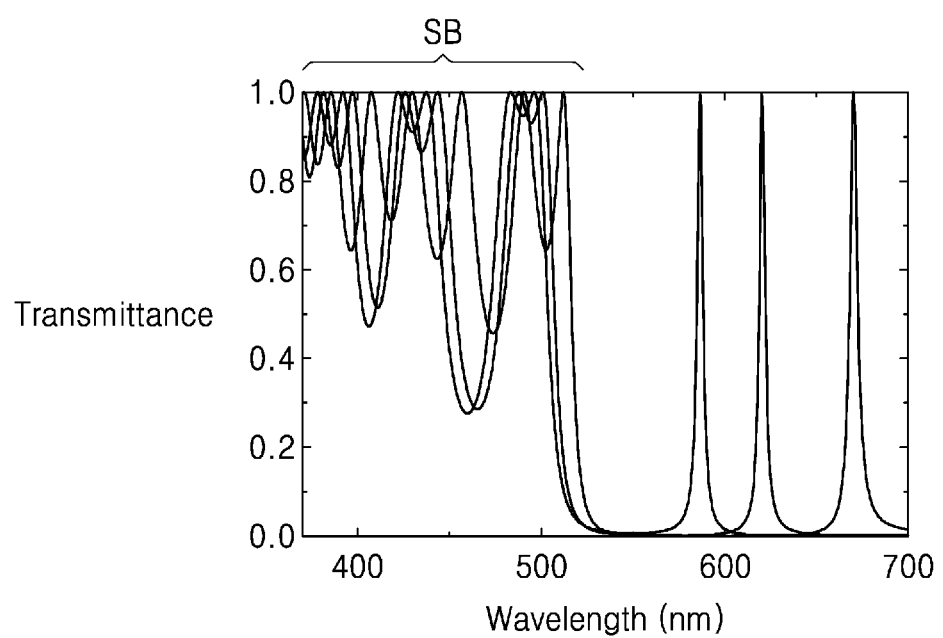
FIG. 11 is a diagram showing an example of a transmission spectrum of the second bandpass filter group of FIG. 9.

FIG. 11 shows an example of a transmission spectrum of the second bandpass filter group 200*a* of FIG. 9. Referring to FIG. 11, the second bandpass filter group 200*a* transmits light of an undesired wavelength band SB, as well as the light of the second wavelength band (about 550 nm to about 700 nm).

Figure 12:
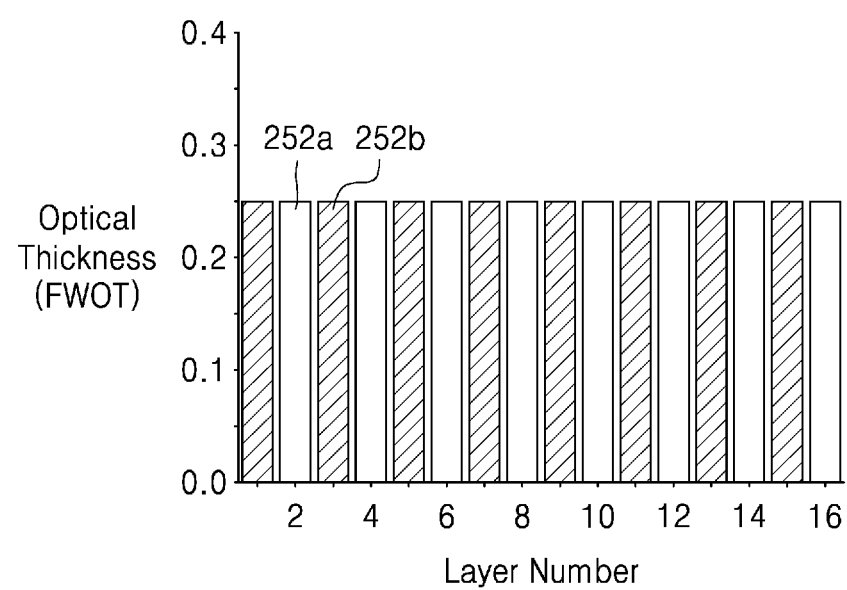
FIG. 12 is a diagram showing optical thicknesses of material layers constituting a first Bragg reflective layer of FIG. 10.

FIG. 12 shows the optical thickness of the first and second material layers 252*a* and 252*b* in the first Bragg reflective layer 252 of FIG. 10. Referring to FIG. 12, the first and second material layers 252*a* and 252*b* in the first Bragg reflective layer 252 have an equal optical thickness. The optical thickness (FWOT) of the first and second material layers 252*a* and 252*b* may be about, for example, 0.25.

Figure 13:
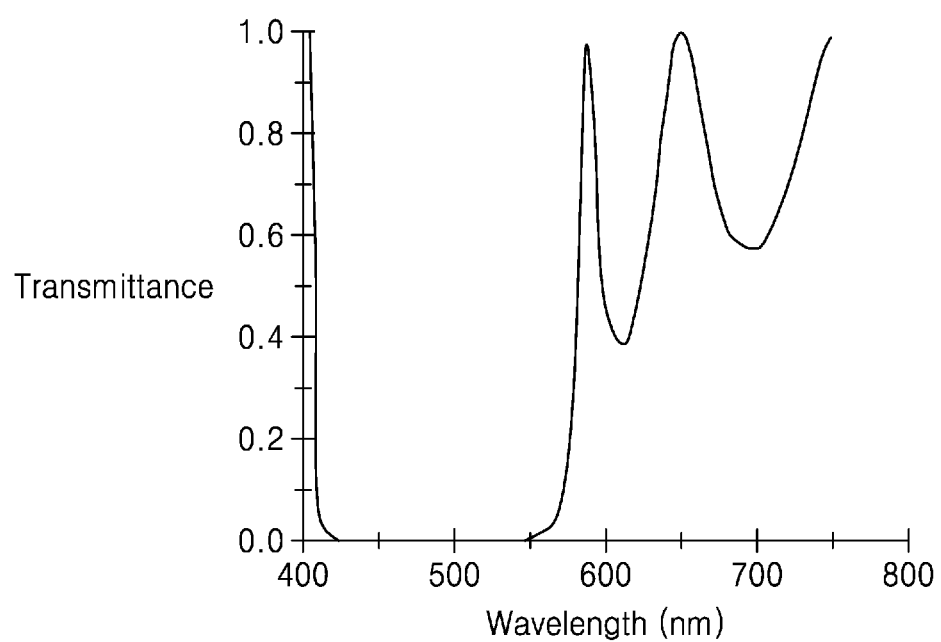
FIG. 13 is a diagram showing an example of a transmission spectrum of the first Bragg reflective layer of FIG. 12.

FIG. 13 is a diagram showing an example of a transmission spectrum of the first Bragg reflective layer 252 of FIG. 12. Referring to FIG. 13, the first Bragg reflective layer 252 mostly reflects the light of the other wavelength bands than the second wavelength band (about 550 nm to about 700 nm).

Figure 14:
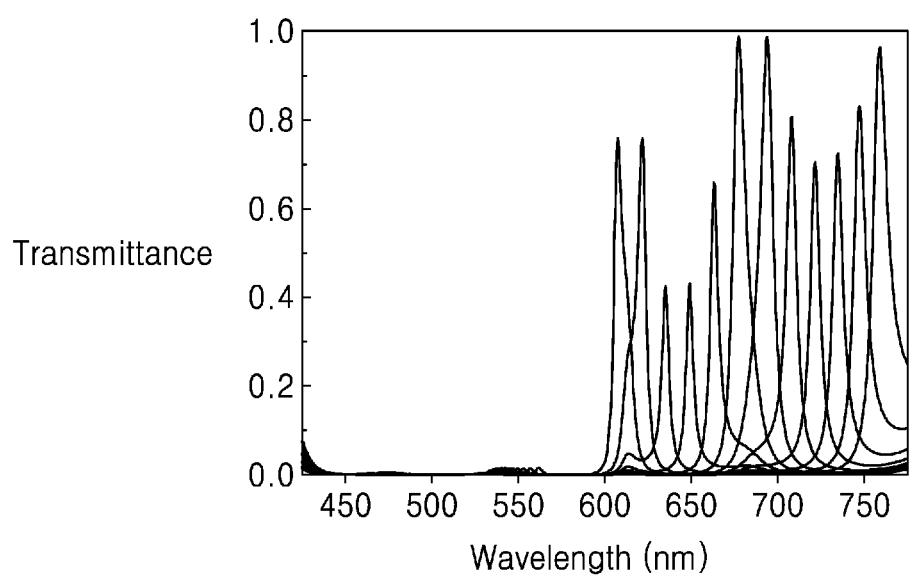
FIG. 14 is a diagram showing an example of a transmission spectrum of a second filter group of FIG. 2.

FIG. 14 is a diagram showing an example of a transmission spectrum of the second filter group 200 of FIG. 2. Referring to FIG. 14, the first Bragg reflective layer 252 provided under the second bandpass filter group 200*a* blocks the light of the other wavelength band than the second wavelength band (about 550 nm to about 700 nm), and thus, the second filter group 200 may only transmit the light of the second wavelength band that is desired.

In the above description, the first Bragg reflective layer 252 is provided under the second bandpass filter group 200*a*, but the first Bragg reflective layer 252 may be provided above the second bandpass filter group 200*a*.

Figure 15:
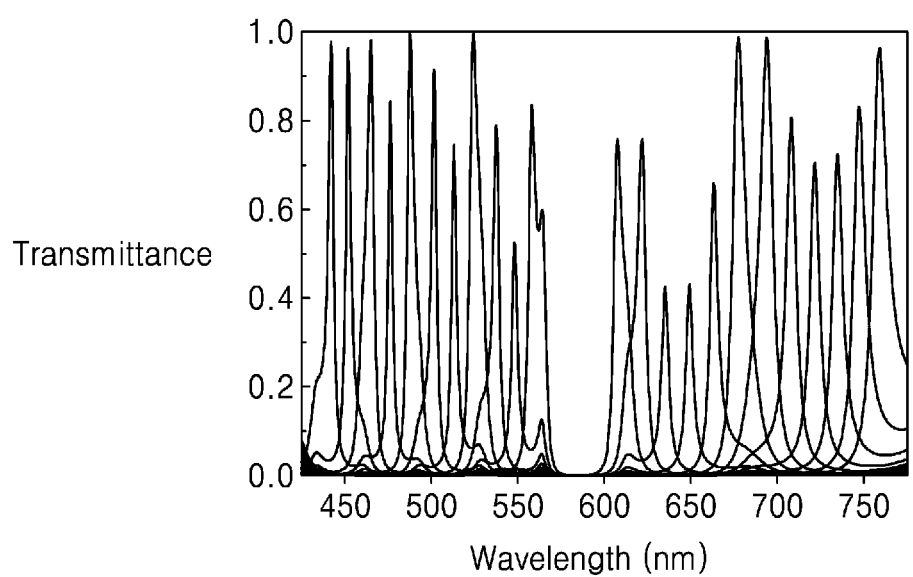
FIG. 15 is a diagram showing an example of a transmission spectrum of an optical filter of FIG. 2.

FIG. 15 is a diagram showing an example of a transmission spectrum of the optical filter 1100 of FIG. 2. Referring to FIG. 15, the first filter group 100 may only transmit the light of the first wavelength band (e.g., about 400 nm to about 550 nm) because the second Bragg reflective layer 152 blocks the light of the wavelength band that is not desired by the first bandpass filter group 100*a*, and the second filter group 200 may only transmit the light of the second wavelength band (e.g., about 550 nm to about 700 nm) because the first Bragg reflective layer 252 blocks the light of the wavelength band that is not desired by the second bandpass filter group 200*a*. Accordingly, the optical filter 1100 according to the example embodiment may implement wideband characteristics only by transmitting the light of the first and second wavelength bands.

Figure 16:
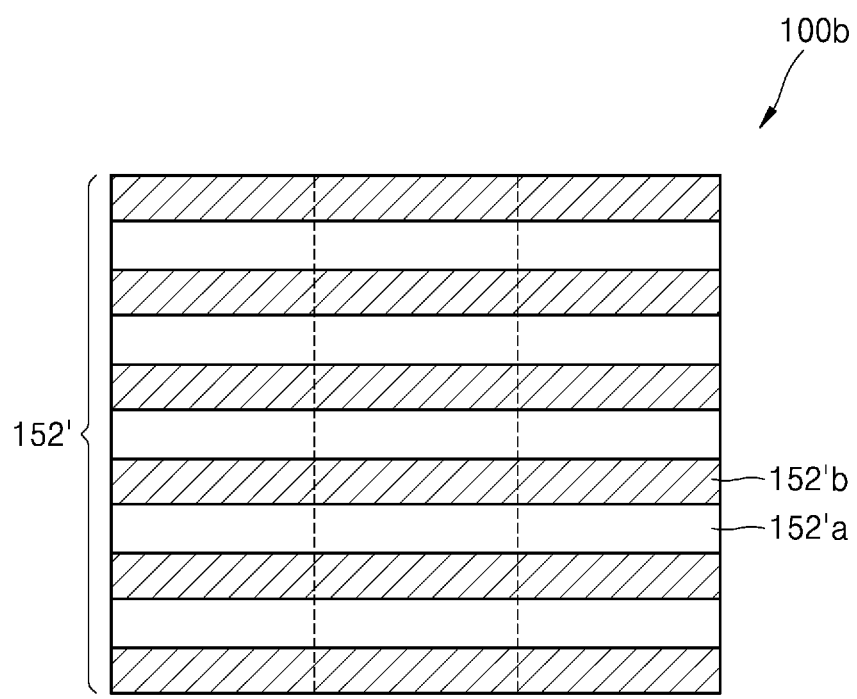
FIG. 16 is a cross-sectional view showing another example of the first multi-layer of FIG. 2.

FIG. 16 is a cross-sectional view showing another example of the first multi-layer 100*b* of FIG. 2.

Referring to FIG. 16, the first multi-layer 100*b* of the first filter group 100 may include a first pass filter 152'. The first pass filter 152' may be a shortpass filter that only transmits the light of a certain wavelength (e.g., about 550 nm) or less.

The first pass filter 152' may be the same as the second Bragg reflective layer 152 of the first filter group 100 described above, except for a thickness of a layer. In detail, the first pass filter 152' may have a structure, in which third and fourth material layers 152'*a* and 152'*b* having different refractive indices are alternately stacked. Here, at least some of the third and fourth material layers 152'*a* and 152'*b* may have a different thickness.

Figure 17:
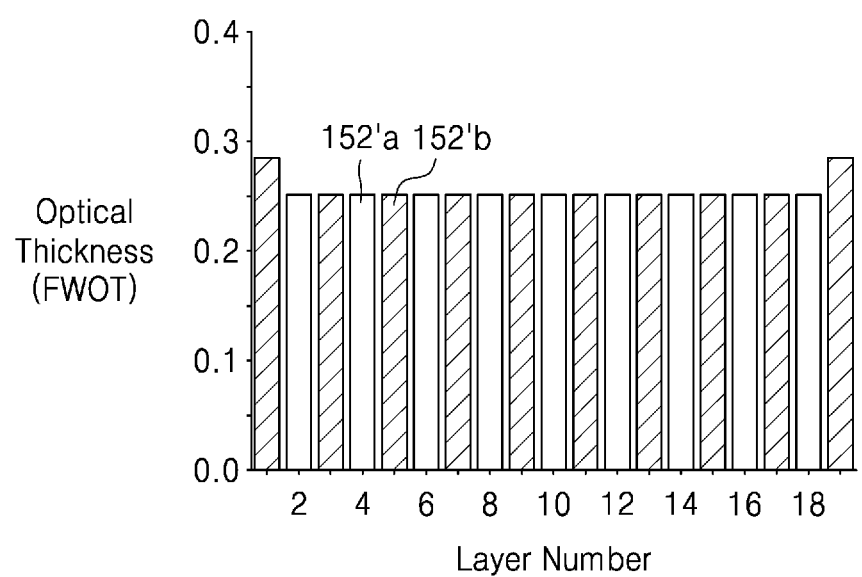
FIG. 17 is a diagram showing an example of optical thicknesses of material layers constituting a first pass filter of FIG. 16.

FIG. 17 shows an example of the optical thickness of the third and fourth material layers 152'*a* and 152'*b* in the first pass filter 152' of FIG. 16. Referring to FIG. 17, among the third and fourth material layers 152'*a* and 152'*b* included in the first pass filter 152', that is, the short pass filter, the outermost material layers (152'*b*) have optical thicknesses greater than those of the other material layers 152'*a* and 152'*b*. For example, the outermost material layers (152'*b*) may have an optical thickness (FWOT) that is greater than about 0.25 and less than about 0.5. In addition, the innermost material layers 152'*a* and 152'*b* may have an optical thickness (FWOT) of about 0.25.

Figure 18:
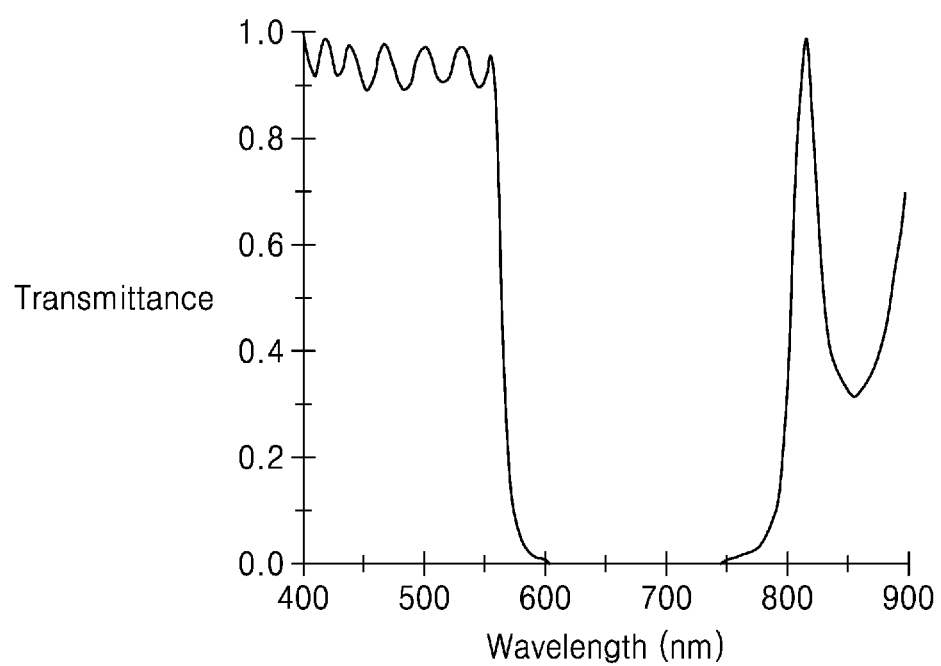
FIG. 18 is a diagram showing an example of a transmission spectrum of a first pass filter of FIG. 17.

FIG. 18 shows an example of the transmission spectrum of the first pass filter 152' shown in FIG. 17. Referring to FIG. 18, the first pass filter 152' has superior transmission characteristic as compared with the second Bragg reflective layer 152 described above, at a certain wavelength (e.g., about 550 nm) or less.

In the above description, an example in which the optical thicknesses of the two outermost fourth material layers 152'*b* from among the third and fourth material layers 152'*a* and 152'*b* included in the first pass filter 152' are changed is shown. However, according to an example embodiment, the optical thicknesses of the third and fourth material layers 152'*a* and 152'*b* may be variously changed.

Figure 19:
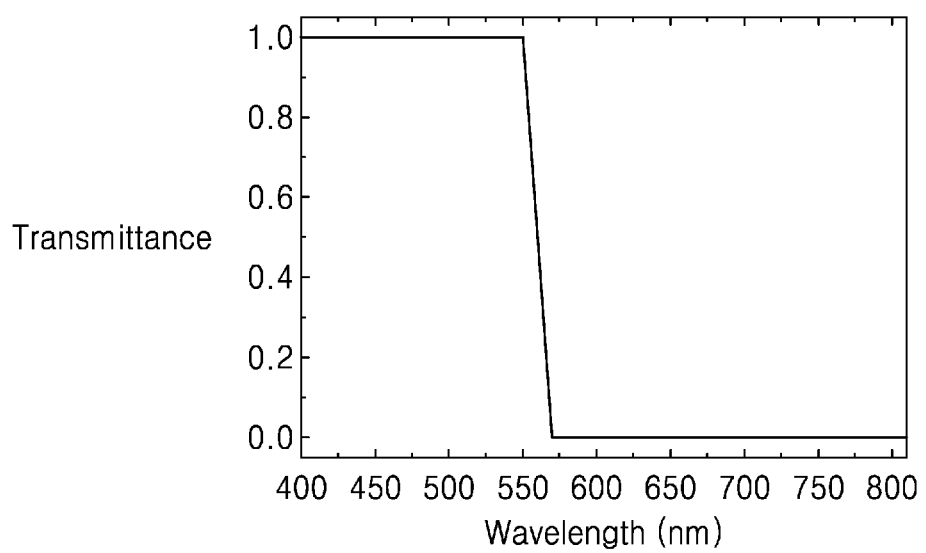
FIG. 19 is a diagram showing an example of a transmission spectrum obtained by adjusting optical thicknesses of material layers constituting a first pass filter of FIG. 16.

FIG. 19 shows an example of the transmission spectrum that is obtained by adjusting the optical thicknesses of the third and fourth material layers 152'*a* and 152'*b* included in the first pass filter 152'. Referring to FIG. 19, excellent transmission characteristics may be implemented by adjusting the optical thicknesses of the third and fourth material layers 152'*a* and 152'*b* included in the first pass filter 152'.

Figure 20:
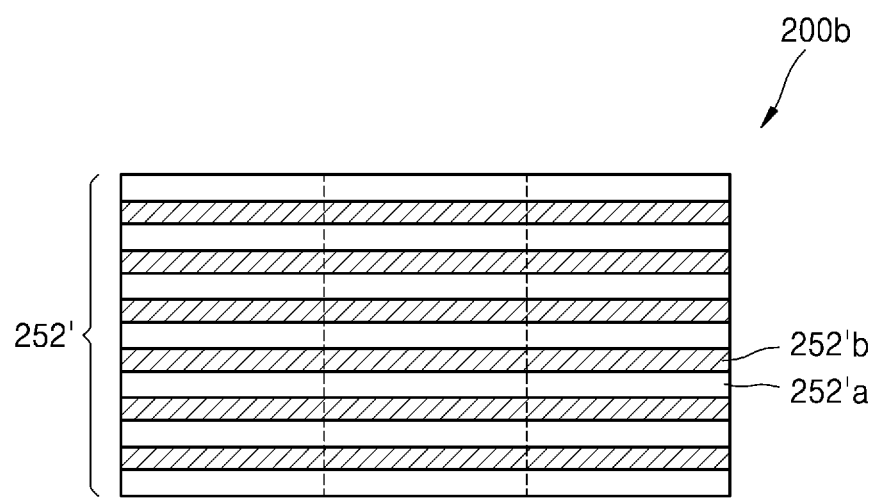
FIG. 20 is a cross-sectional view showing another example of a second multi-layer of FIG. 2.

FIG. 20 is a cross-sectional view showing another example of the second multi-layer 200*b* of FIG. 2.

Referring to FIG. 20, the second multi-layer 200*b* of the second filter group 200 may include a second pass filter 252'. The second pass filter 252' may be a longpass filter that only transmits the light of a certain wavelength (e.g., about 550 nm) or greater.

The second pass filter 252' may be the same as the first Bragg reflective layer 252 of the second filter group 200 described above, except for a thickness of a layer. In detail, the second pass filter 252' may have a structure, in which first and second material layers 252'*a* and 252'*b* having different refractive indices are alternately stacked. Here, at least some of the first and second material layers 252'*a* and 252'*b* may have different thicknesses from those of the others).

Figure 21:
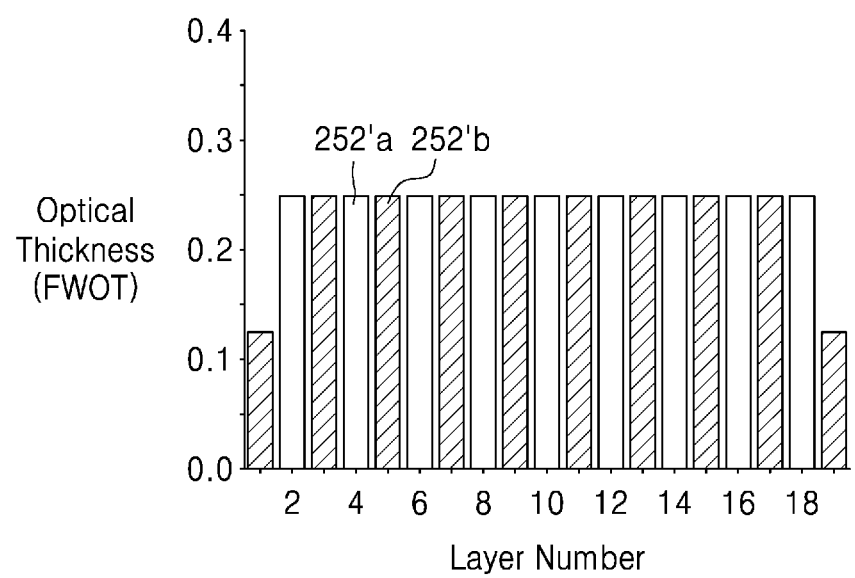
FIG. 21 is a diagram showing an example of optical thicknesses of material layers constituting a second pass filter of FIG. 20.

FIG. 21 shows an example of the optical thickness of the first and second material layers 252'*a* and 252'*b* in the second pass filter 252' of FIG. 20. Referring to FIG. 21, from among the first and second material layers 252'*a* and 252'*b* included in the second pass filter 252', that is, the longpass filter, two outermost material layers 252'*b* have optical thicknesses that are less than those of the other material layers 252'*a* and 252'*b*. For example, the outermost material layers 252'*b* may have an optical thickness (FWOT) that is greater than about 0.1 and less than about 0.25. In addition, the inner material layers 252'*a* and 252'*b* may have an optical thickness (FWOT) of about 0.25.

Figure 22:
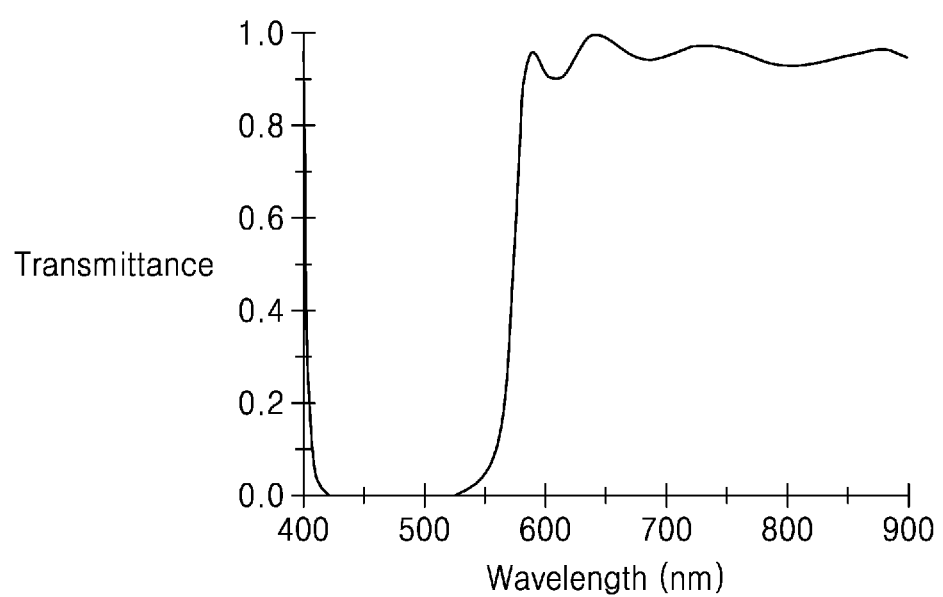
FIG. 22 is a diagram showing an example of a transmission spectrum of a second pass filter of FIG. 21.

FIG. 22 shows an example of the transmission spectrum of the second pass filter 252' shown in FIG. 21. Referring to FIG. 22, the second pass filter 252' has superior transmission characteristic as compared with the first Bragg reflective layer 252 described above, at a certain wavelength (e.g., about 550 nm) or greater.

Figure 23:
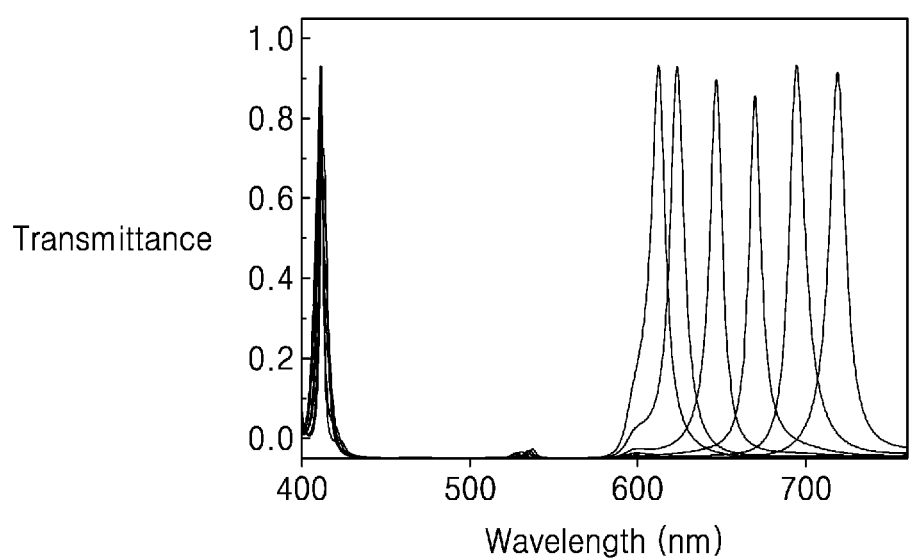
FIG. 23 is a diagram showing an example of a transmission spectrum of a second filter group adopting the second pass filter of FIG. 21.

FIG. 23 is a diagram showing an example of a transmission spectrum of the second filter group 200 adopting the second pass filter 252' of FIG. 21. Referring to FIG. 23, the transmission spectrum of the second filter group 200 adopting the second pass filter 252' has superior transmission characteristics as compared with the transmission spectrum of the second filter group 200 adopting the first Bragg reflective layer 252 shown in FIG. 14.

In the above description, an example in which the optical thicknesses of the two outermost second material layers 252'*b* from among the first and second material layers 252'*a* and 252'*b* included in the second pass filter 252' are changed is shown. However, according to an example embodiment, the optical thicknesses of the first and second material layers 252'*a* and 252'*b* may be variously changed.

Figure 24:
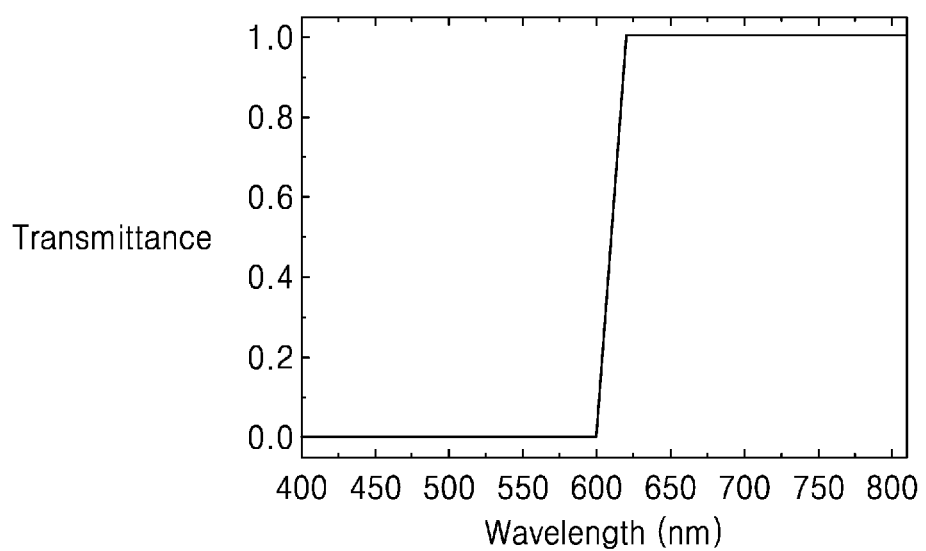
FIG. 24 is a diagram showing an example of a transmission spectrum obtained by adjusting optical thicknesses of material layers constituting a second pass filter of FIG. 20.

FIG. 24 shows an example of the transmission spectrum that is obtained by adjusting the optical thicknesses of the first and second material layers 252'*a* and 252'*b* included in the second pass filter 252'. Referring to FIG. 24, excellent transmission characteristics may be implemented by adjusting the optical thicknesses of the first and second material layers 252'*a* and 252'*b* included in the second pass filter 252'.

Figure 25:
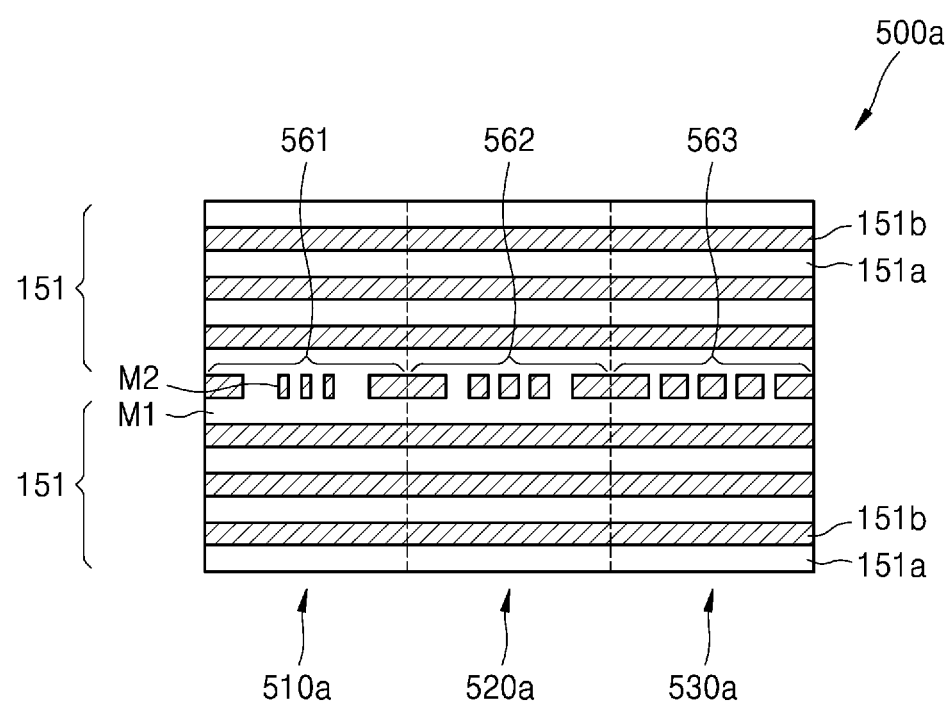
FIG. 25 is a diagram showing another example of a first bandpass filter group that may be adopted in the optical filter of FIG. 2.

FIG. 25 is a diagram showing an example of a first bandpass filter group 500*a* that may be adopted in the optical filter 1100 of FIG. 2 according to another example embodiment. The first bandpass filter group 500*a* shown in FIG. 25 is the same as the first bandpass filter group 100*a* of FIG. 3, except for cavities 561, 562, and 563.

Referring to FIG. 25, the first bandpass filter group 500*a* may include first, second, and third bandpass filters 510*a*, 520*a*, and 530*a* having different center wavelengths from one another within the first wavelength band. Each of the first, second, and third bandpass filters 510*a*, 520*a*, and 530*a* includes two first Bragg reflective layers 151 and a cavity 561, 562, or 563 between the first Bragg reflective layers 151. Here, the first, second, and third bandpass filters 510*a*, 520*a*, and 530*a* may respectively include the first, second, and third cavities 561, 562, and 563 having different effective refractive indices from one another.

The first cavity 561 may have a structure in which a first material layer M1 and a second material layer M2 having different refractive indices are alternately stacked. For example, the first material layer M1 may include silicon and the second material layer M2 may include silicon oxide. However, one or more embodiments are not limited thereto, and the first and second material layers may include various other materials.

FIG. 25 shows an example in which the first and second material layers are arranged in a direction perpendicular to the first Bragg reflective layer 151. However, one or more example embodiments are not limited thereto, and the first and second material layers may be arranged in parallel with the first Bragg reflective layer 151 or may be two-dimensionally arranged.

The second cavity 562 may include the first and second material layers having different widths from those of the first cavity 561, and thus, may have a different effective refractive index from that of the first cavity 561. Also, the third cavity 563 may include the first and second material layers having different widths from those of the first and second cavities 561 and 562, and thus, may have a different effective refractive index from those of the first and second cavities 561 and 562. As described above, the first, second, and third cavities 561, 562, and 563 may implement different center wavelengths from one another by the different effective refractive indices.

For example, the second material layer M2 in the first cavity 561 may have a plurality of first second material layer sections, the second material layer M2 in the second cavity 562 may have a plurality of second second material layer sections and the second material layer M2 in the second cavity 563 may have a plurality of third second material layer sections. Further, the widths of each of the plurality of first second material layer sections are different that the widths of each of the plurality of second second material layer sections, and the widths of each of the plurality of third second material layer sections are different that the widths of each of the plurality of second second material layer sections.

Figure 26:
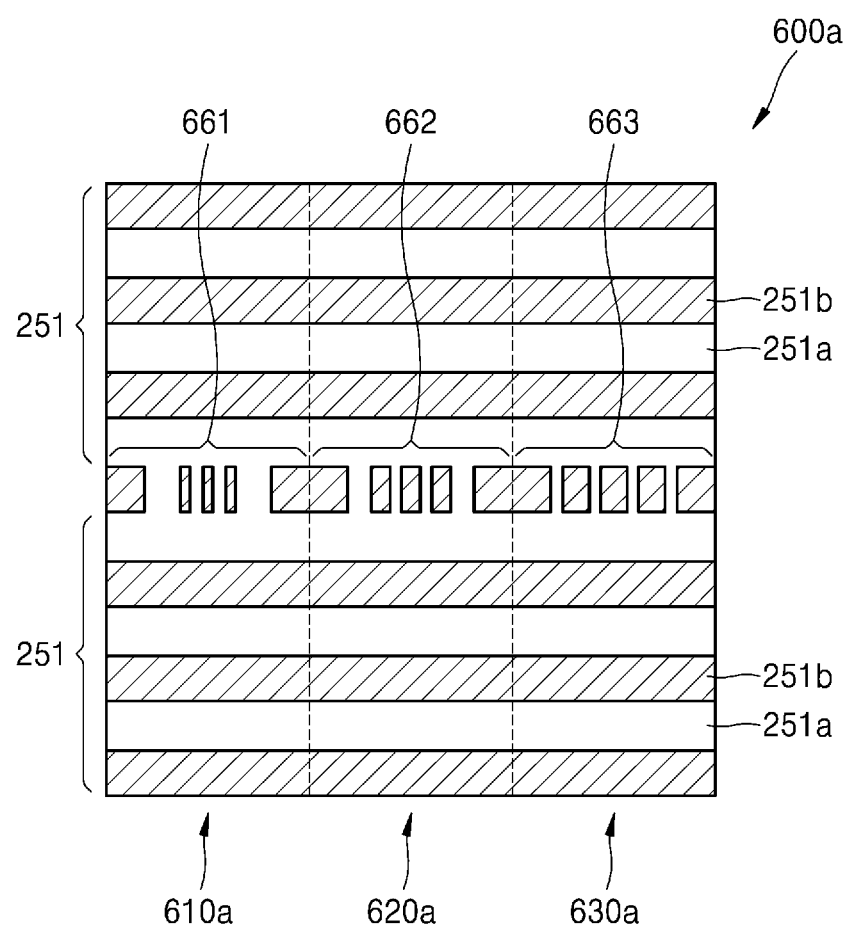
FIG. 26 is a diagram showing another example of a second bandpass filter group that may be adopted in the optical filter of FIG. 2.

FIG. 26 is a diagram showing an example of a second bandpass filter group 600*a* that may be adopted in the optical filter 1100 of FIG. 2. The second bandpass filter group 600*a* shown in FIG. 26 is the same as the second bandpass filter group 200*a* of FIG. 9, except for cavities 661, 662, and 663.

Referring to FIG. 26, the second bandpass filter group 600*a* may include fourth, fifth, and sixth bandpass filters 610*a*, 620*a*, and 630*a* having different center wavelengths from one another within the second wavelength band. Each of the fourth, fifth, and sixth bandpass filters 610*a*, 620*a*, and 630*a* includes two second Bragg reflective layers 251 and a cavity 661, 662, or 663 between the two second Bragg reflective layers 251. Here, the fourth, fifth, and sixth bandpass filters 610*a*, 620*a*, and 630*a* may respectively include the fourth, fifth, and sixth cavities 661, 662, and 663 having different effective refractive indices from one another.

The fourth cavity 661 may have a structure in which first and second material layers having different refractive indices are alternately stacked. For example, the first material layer may include silicon and the second material layer may include silicon oxide. However, one or more embodiments are not limited thereto, and the first and second material layers may include various other materials.

FIG. 26 shows an example in which the first and second material layers are arranged in a direction perpendicular to the second Bragg reflective layer 251. However, one or more embodiments are not limited thereto, and the first and second material layers may be arranged in parallel with the second Bragg reflective layer 251 or may be two-dimensionally arranged.

The fifth cavity 662 may include the first and second material layers having different widths from those of the fourth cavity 661, and thus, may have a different effective refractive index from that of the fourth cavity 661. Also, the sixth cavity 663 may include the first and second material layers having different widths from those of the fourth and fifth cavities 661 and 662, and thus, may have a different effective refractive index from those of the fourth and fifth cavities 661 and 662. As described above, the fourth, fifth, and sixth cavities 661, 662, and 663 may implement different center wavelengths from one another by the different effective refractive indices.

Figure 27:
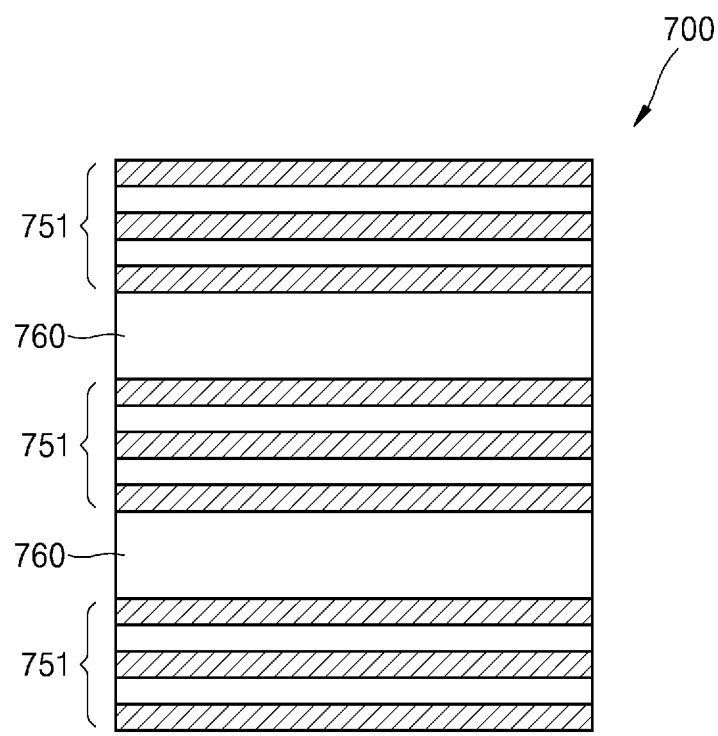
FIG. 27 is a diagram showing another example of a bandpass filter that may be adopted in the optical filter of FIG. 2.

FIG. 27 is a diagram showing an example of another bandpass filter 700 that may be adopted in the optical filter 1100 of FIG. 2. The bandpass filter 700 of FIG. 27 may be applied to the first and second bandpass filter groups 100a and 200a of FIG. 2.

Referring to FIG. 27, the bandpass filter 700 includes three Bragg reflective layers 751 spaced apart from one another, and two cavities 760 between the Bragg reflective layers 751. Here, the Bragg reflective layers 751 may be a DBR. FIG. 27 shows an example in which the bandpass filter 700 includes two cavities 760, but the bandpass filter 700 may include three or more cavities 760.

Figure 28:
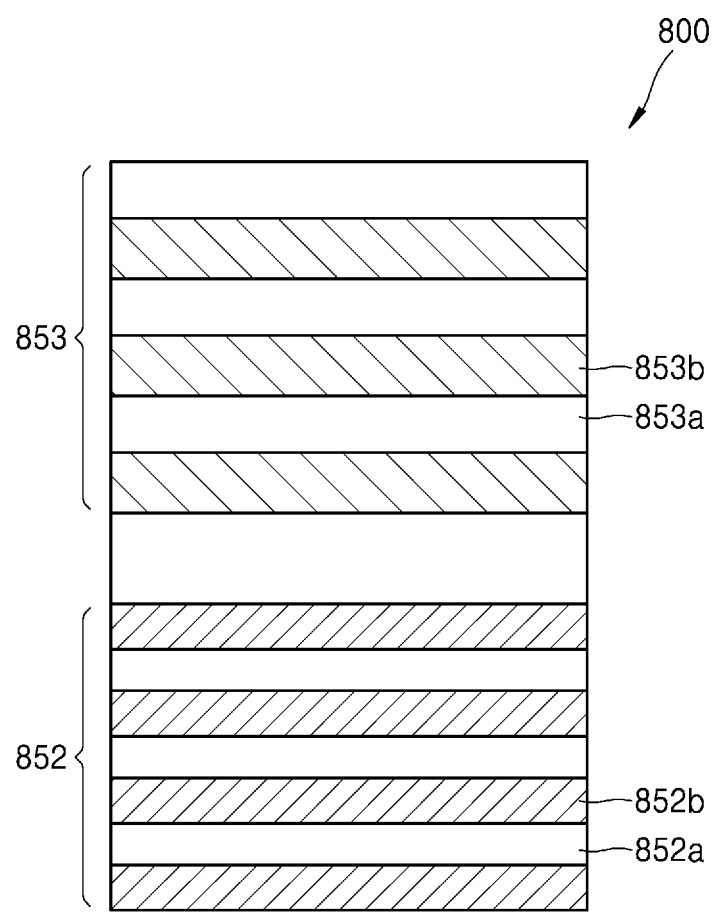
FIG. 28 is a diagram showing another example of a multi-layer that may be adopted in the optical filter of FIG. 2.

FIG. 28 shows an example of another multi-layer 800 that may be adopted in the optical filter 1100 of FIG. 2. The multi-layer 800 of FIG. 28 may be applied to the first and second multi-layers 100b and 200b of FIG. 2.

Referring to FIG. 28, the multi-layer 800 includes a first Bragg reflective layer 852 and a second Bragg reflective layer 853 stacked on the first Bragg reflective layer 852. The first and second Bragg reflective layers 852 and 853 may have reflective wavelength bands that are different from that of the Bragg reflective layer in a bandpass filter of the multi-layer 800. Here, a position of the bandpass filter on the multi-layer 800 may be variously modified. For example, the bandpass filter may be on or under the first and second Bragg reflective layers 852 and 853, or may be between the first and second Bragg reflective layers 852 and 853.

The first Bragg reflective layer 852 may have a structure, in which first and second material layers 852a and 852b having different refractive indices are alternately stacked, and the second Bragg reflective layer 853 may have a structure, in which third and fourth material layers 853a and 853b having different refractive indices are alternately stacked. Here, at least one of the material and the thickness of the third and fourth material layers 853a and 853b may be different from that of the first and second material layers 852a and 852b. FIG. 28 shows an example in which the multi-layer 800 includes two Bragg reflective layers, that is, the first and second Bragg reflective layers 852 and 853, but the multi-layer 800 may include three or more Bragg reflective layers.

Figure 29:
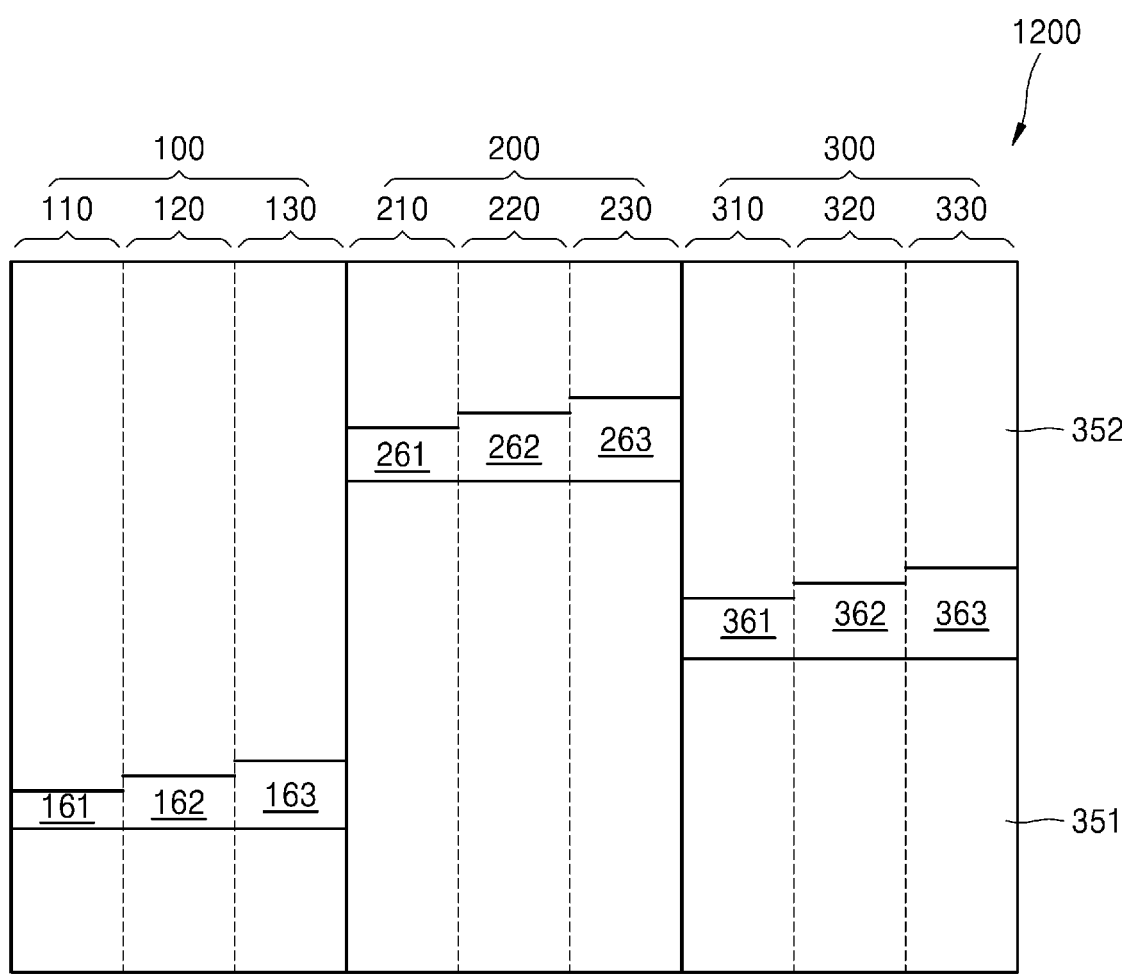
FIG. 29 is a cross-sectional view of an optical filter according to another example embodiment.

FIG. 29 is a cross-sectional view of an optical filter 1200 according to another example embodiment. Hereinafter, the differences of the optical filter 1200 from those of the above-described example embodiments will be described.

Referring to FIG. 29, the optical filter 1200 includes first, second, and third filter groups 100, 200, and 300 arranged on the same plane. The first filter group 100 includes first to third filter units 110, 120, and 130, and the second filter group 200 includes fourth to sixth filter units 210, 220, and 230. The first filter group 100 may have center wavelengths within the first wavelength band, and the second filter group 200 may have center wavelengths within the second wavelength band. The first and second filter groups 100 and 200 are the same as the first and second filter groups 100 and 200 shown in FIG. 2, and thus, descriptions thereof are omitted.

The third filter group 300 includes seventh, eighth, and ninth filter units 310, 320, and 330. Here, each of the seventh to ninth filter units 310, 320, and 330 of the third filter group 300 includes first and second Bragg reflective layers 351 and 352 and cavities 361, 362, and 363 between the first and second Bragg reflective layers 351 and 352. Here, each of the seventh, eight, and ninth cavities 361, 362, and 363 may include a dielectric material having a certain refractive index. For example, each of the seventh, eight, and ninth cavities 361, 362, and 363 may include silicon, silicon oxide, or titanium oxide.

The seventh, eighth, and ninth filter units 310, 320, and 330 may include the seventh to ninth cavities 361, 362, and 363 having different thicknesses from one another. For example, the seventh cavity 361 has a thickness that is less than that of the eighth cavity 362, and the ninth cavity 363 may have a thickness that is greater than that of the eighth cavity 362. Accordingly, the seventh to ninth filter units 310, 320, and 330 may have different center wavelengths from one another. The third filter group 300 including the seventh to ninth filter units 310, 320, and 330 may have the center wavelengths within a wavelength band between the first and second wavelength bands. In addition, the seventh to ninth filter units 310, 320, and 330 may have seventh to ninth cavities having different effective refractive indices from one another.

Figure 30:
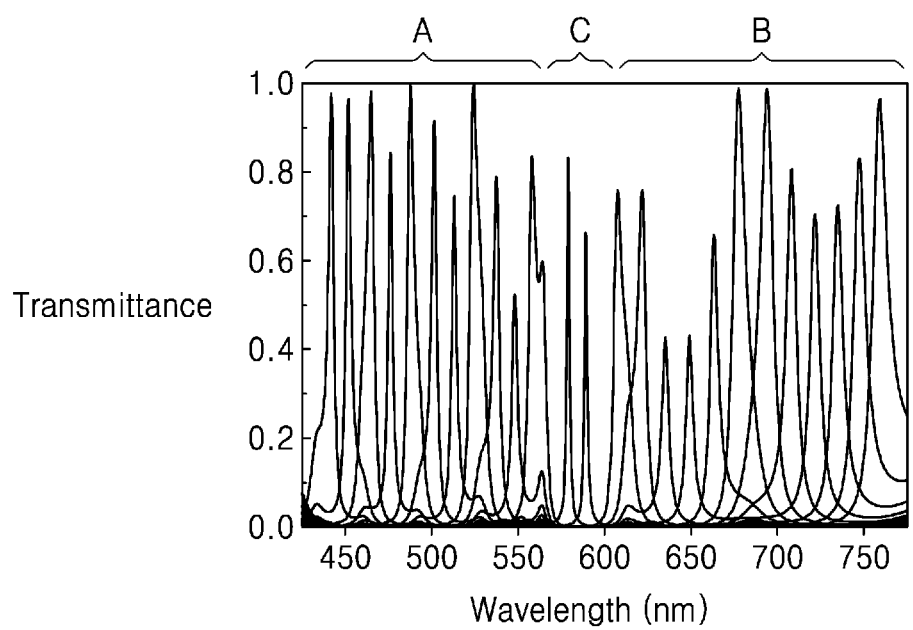
FIG. 30 is a diagram showing an example of a transmission spectrum of an optical filter of FIG. 29.

FIG. 30 shows an example of the transmission spectrum of the optical filter 1200 of FIG. 29.

In FIG. 30, "A" denotes a transmission spectrum of the first filter group 100, "B" denotes a transmission spectrum of the second filter group 200, and "C" denotes a transmission spectrum of the third filter group 300.

Referring to FIG. 30, the third filter group 300 may implement the center wavelengths within the wavelength band between the first wavelength band of the first filter group 100 and the second wavelength band of the second filter group 200.

Figure 31:
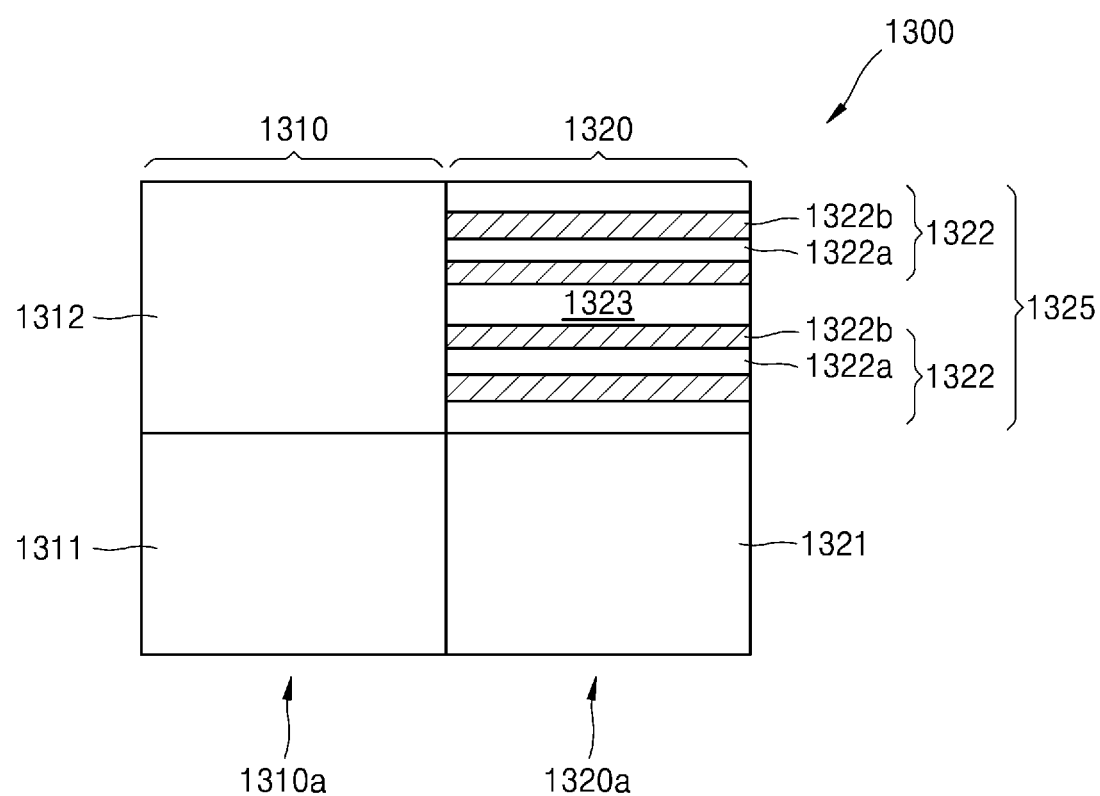
FIG. 31 is a cross-sectional view of an optical filter according to another example embodiment.

FIG. 31 is a cross-sectional view of an optical filter 1300 according to another example embodiment.

Referring to FIG. 31, the optical filter 1300 may include first and second filter groups 1310 and 1320 arranged on the same plane. Each of the first and second filter groups 1310 and 1320 may include one or more filter units. FIG. 31 shows an example, in which the first and second filter groups 1310 and 1320 each include one filter unit, for example, a first filter unit 1310a or a second filter unit 1320a, for convenience of description. When each of the first and second filter groups 1310 and 1320 includes a plurality of filter units, the plurality of filter units may include cavities having different thicknesses from one another.

The first filter unit 1310a includes a first bandpass filter 1311 and a first multi-layer 1312 provided on the first bandpass filter 1311. Here, the first filter unit 1310a may be the same as the first to third filter units 110a, 120a, and 130a shown in FIG. 2, and thus, descriptions thereof are omitted. The first filter unit 1310a may have a center wavelength of a short wavelength band.

The second filter unit 1320a includes a second multi-layer 1321 and a second bandpass filter 1325 on the second multi-layer 1321. Here, the second multi-layer 1321 may be the same as the second multi-layer 200b shown in FIG. 2, and thus, descriptions thereof are omitted.

The second bandpass filter 1325 may have a cavity structure having a center wavelength in a long wavelength band, and may include a material that may absorb the light of short wavelength. The short wavelength is shorter than the long wavelength. The second bandpass filter 1325 may include two Bragg reflective layers 1322 and a cavity 1323 between the Bragg reflective layers 1322.

Each of the Bragg reflective layers 1322 may have a structure, in which first and second material layers 1322a and 1322b having different refractive indices from each other are alternately stacked. Here, one of the first and second material layers 1322a and 1322b may include a material (e.g., silicon, GaP, etc.) that may absorb the light of the first wavelength band, e.g., the light of short wavelength. For example, the first and second material layers 1322a and 1322b may include silicon and silicon oxide. For instance, the first material layers 1322a may include silicon and the second material layers 1322b may include silicon oxide. The cavity 1323 between the Bragg reflective layers 1322 may include, for example, silicon.

Figure 32:
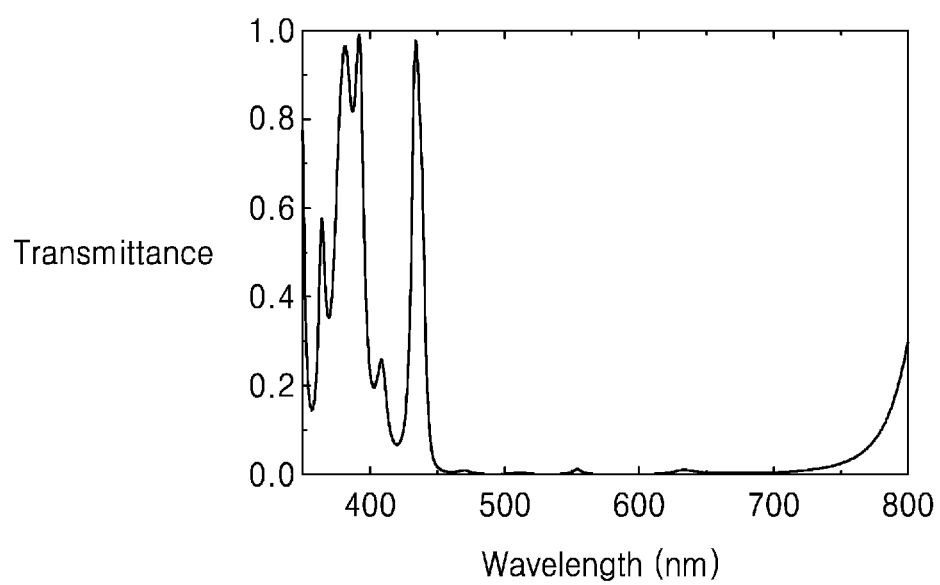
FIG. 32 is a diagram showing an example of a transmission spectrum of a first filter unit of FIG. 31.

FIG. 32 is a diagram showing an example of a transmission spectrum of the first filter unit 1310a of FIG. 31. Referring to FIG. 32, the first filter unit 1310a transmits the center wavelength in the short wavelength band.

Figure 33:
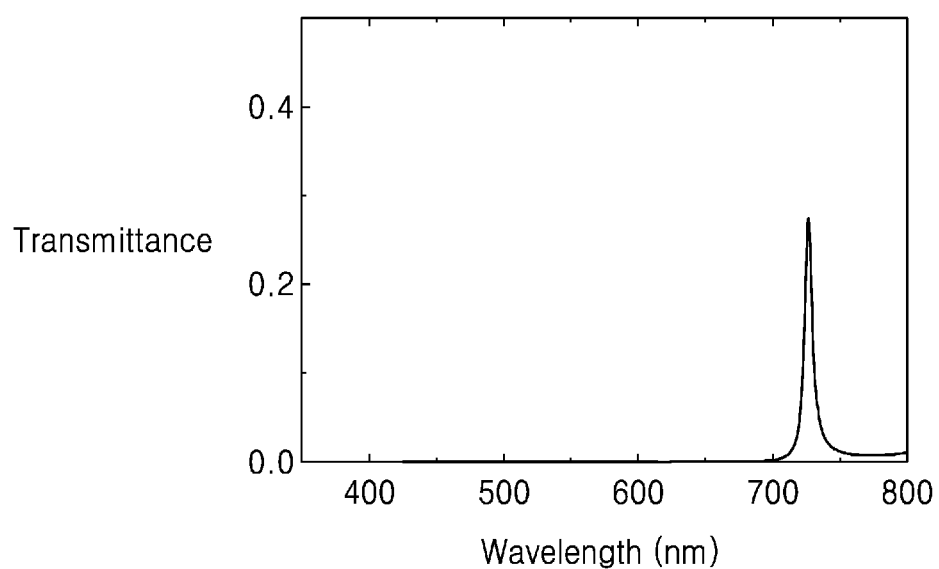
FIG. 33 is a diagram showing an example of a transmission spectrum of a second filter unit of FIG. 31.

FIG. 33 is a diagram showing an example of a transmission spectrum of the second filter unit 1320a of FIG. 31. Here, the first and second material layers 1322a and 1322b include silicon and silicon oxide, and the cavity 1323 includes silicon. Referring to FIG. 33, because silicon absorbs the light of the short wavelength band, the second filter unit 1320a may only transmit the center wavelength of the long wavelength band.

In the above description, the second multi-layer 1321 is provided under the second bandpass filter 1325, but the second multi-layer 1321 may be omitted.

Figure 34:
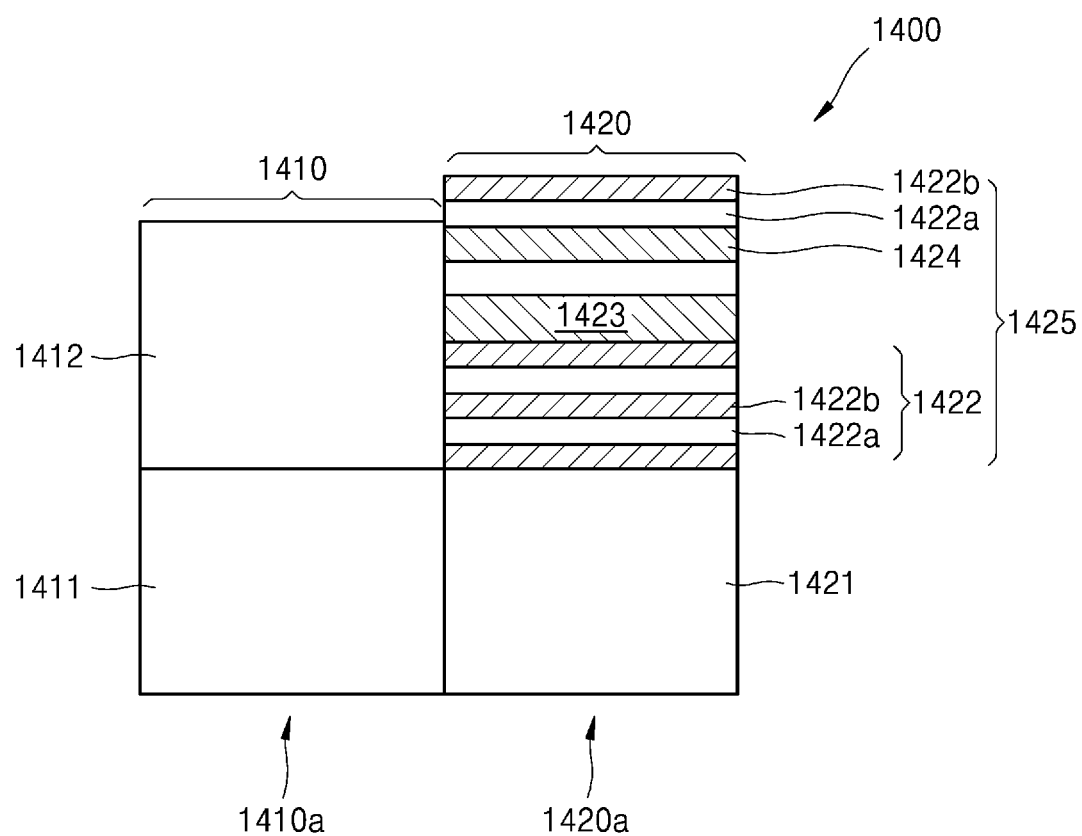
FIG. 34 is a cross-sectional view of an optical filter according to another example embodiment.

FIG. 34 is a cross-sectional view of an optical filter 1400 according to another example embodiment. The optical filter 1400 of FIG. 34 is the same as the optical filter 1300 of FIG. 31, except for a second bandpass filter 1425.

The first filter unit 1410 includes a first bandpass filter 1411 and a first multi-layer 1412 on the first bandpass filter 1411. The first filter unit 1410 may have a center wavelength of a short wavelength band. The second filter unit 1420 includes a second multi-layer 1421 and a second bandpass filter 1425 on the second multi-layer 1421.

The second bandpass filter 1425 may have a cavity structure having a center wavelength in a long wavelength band, and may include a material that may absorb the light of short wavelength. The second bandpass filter 1425 may include a Bragg reflective layer 1422, a cavity 1423, and a short-wavelength absorption layer 1424.

The Bragg reflective layers 1422 may have a structure, in which first and second material layers 1422a and 1422b having different refractive indices from each other are alternately stacked. For example, the first and second material layers 1422a and 1422b may include silicon oxide and titanium oxide. The Bragg reflective layer 1422 may include the cavity 1423. The cavity 1423 may include, for example, silicon. The cavity 1423 may include a short-wavelength absorption layer 1424. Here, the short-wavelength absorption layer 1424 may include, for example, silicon or GaP.

Figure 35:
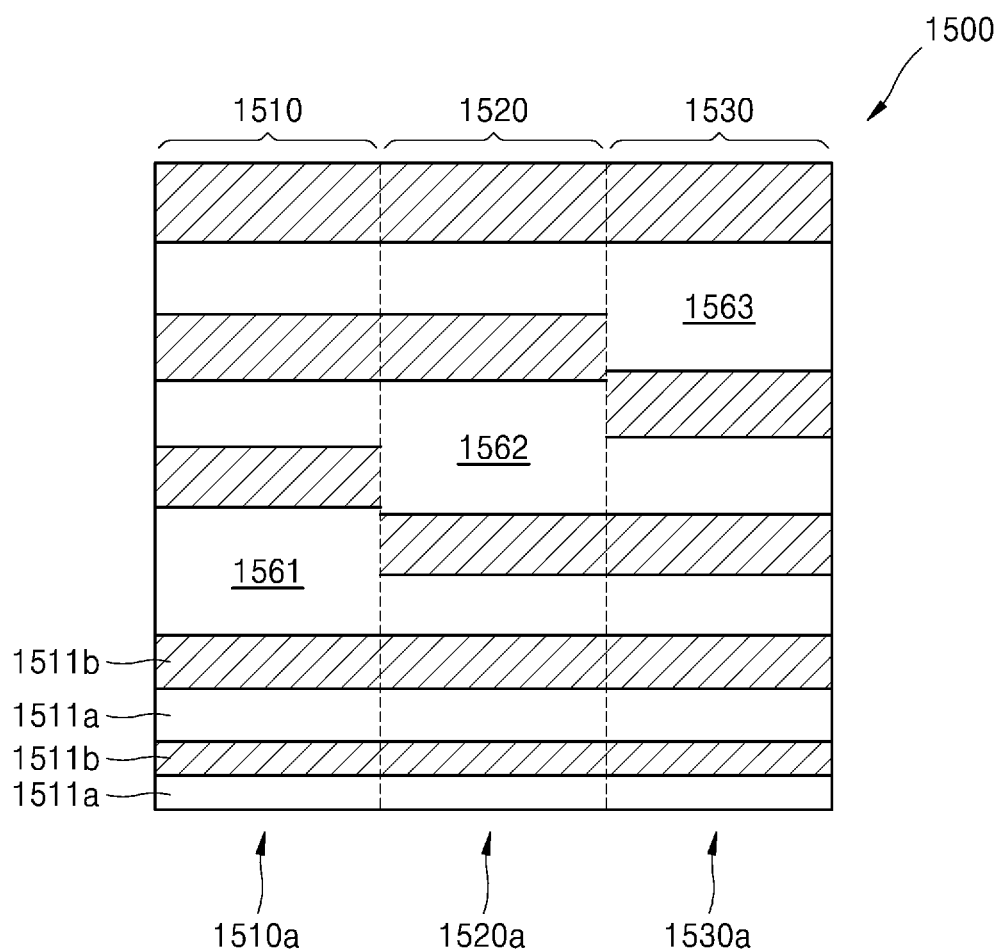
FIG. 35 is a cross-sectional view of an optical filter according to another example embodiment.

FIG. 35 is a cross-sectional view of an optical filter 1500 according to another example embodiment.

Referring to FIG. 35, the optical filter 1500 may include first, second, and third filter groups 1510, 1520, and 1530 arranged on the same plane. Each of the first to third filter groups 1510, 1520, and 1530 may include one or more filter units. FIG. 35 shows an example in which each of the first to third filter groups 1510, 1520, and 1530 includes one filter unit, for example, a first filter unit 1510a, a second filter unit 1520a, or a third filter unit 1530a. When each of the first to third filter groups 1510, 1520, and 1530 includes a plurality of filter units, the plurality of filter units may include cavities having different thicknesses from one another.

Each of the first, second, and third filter units 1510a, 1520a, and 1530a may have a structure, in which first and second material layers 1511a and 1511b are alternately stacked, and the first and second material layers 1511a and 1511b have optical thicknesses that are gradually increased in one direction (for example, up direction in FIG. 35). For example, the first and second material layers 1511a and 1511b may have optical thicknesses (FWOT) that are gradually increased from about 0.15 to about 0.35 in the up direction.

Figure 36:
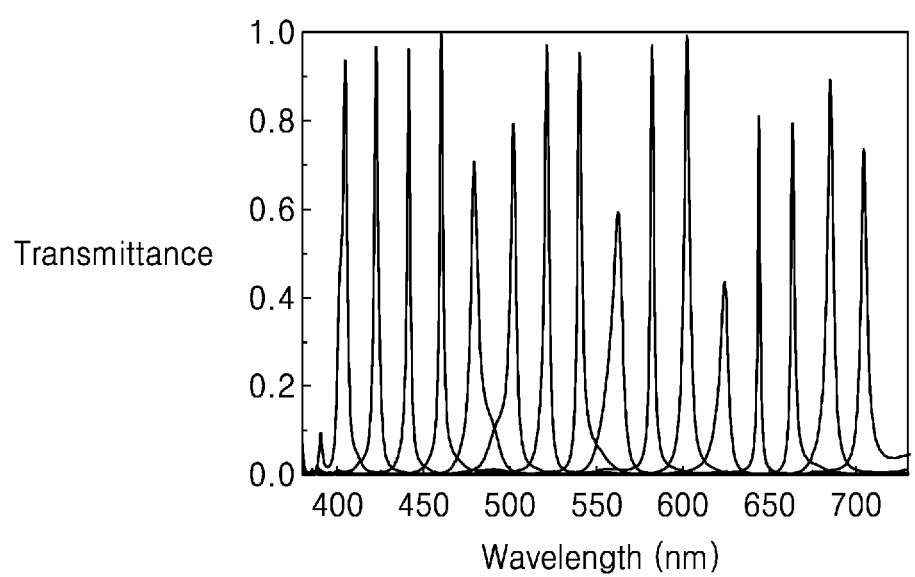
FIG. 36 is a diagram showing an example of a transmission spectrum of an optical filter of FIG. 35.

Each of the first to third filter units 1510a, 1520a, and 1530a may include first, second, and third cavities 1561, 1562, and 1563 between the first and second material layers 1511a and 1511b. Here, the first to third cavities 1561, 1562, and 1563 may be at different locations between the first and second material layers 1511a and 1511b. FIG. 36 shows an example of the transmission spectrum of the optical filter 1500 of FIG. 35.

Figure 37:
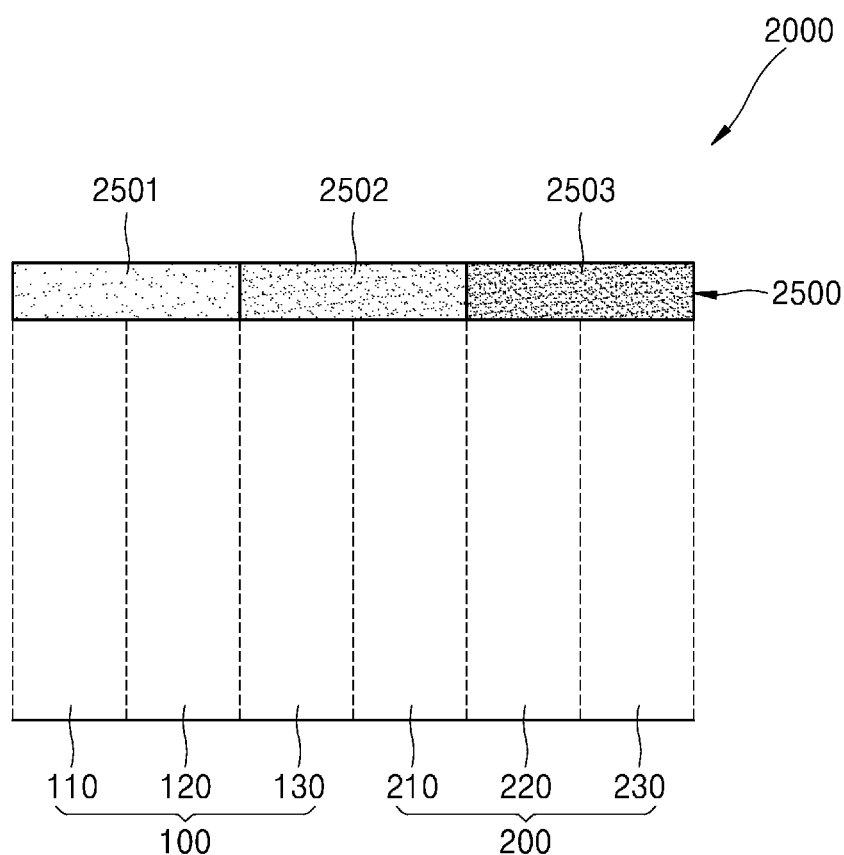
FIG. 37 is a cross-sectional view of an optical filter according to another example embodiment.

FIG. 37 is a cross-sectional view of an optical filter 2000 according to another example embodiment.

Referring to FIG. 37, the optical filter 2000 includes filter units 110, 120, 130, 210, 220, and 230, and an additional filter 2500 on the first to sixth filter units 110, 120, 130, 210, 220, and 230.

The additional filter 2500 may include a plurality of additional filter units, for example, first, second, and third additional filter units 2501, 2502, and 2503. The first additional filter unit 2501 corresponds to the first and second filter units 110 and 120, the second additional filter unit 2502 corresponds to the third and fourth filter units 130 and 210, and the third filter unit 2503 corresponds to the fifth and sixth filter units 220 and 230. However, one or more example embodiments are not limited thereto, and each of the first to third additional filter units 2501, 2502, and 2503 may correspond to one filter unit or three or more filter units.

When the first and second filter units 110 and 120 transmit the first wavelength band, the first additional filter unit 2501 may block the light of the other wavelength bands than the first wavelength band desired by the first and second filter units 110 and 120. For example, when the first and second filter units 110 and 120 transmit the wavelength band of about 400 nm to about 500 nm, the first additional filter unit 2501 may be a blue filter unit that transmits the wavelength band of blue light.

When the third and fourth filter units 130 and 210 transmit the second wavelength band, the second additional filter unit 2502 may block the light of the other wavelength bands than the second wavelength band desired by the third and fourth filter units 130 and 210. For example, when the third and fourth filter units 130 and 210 transmit the wavelength band of about 500 nm to about 600 nm, the second additional filter unit 2502 may be a green filter unit that transmits the wavelength band of green light.

When the fifth and sixth filter units 220 and 230 transmit the third wavelength band, the third additional filter unit 2503 may block the light of the other wavelength bands than the third wavelength band desired by the fifth and sixth filter units 220 and 230. For example, when the fifth and sixth filter units 220 and 230 transmit the wavelength band of about 600 nm to about 700 nm, the third additional filter unit 2503 may be a red filter unit that transmits the wavelength band of red light.

The additional filter (2500 may include a color filter. In this case, the first to third additional filter units 2501, 2502, and 2503 may be first, second, and third color filter units, respectively. The color filter may include, for example, a color filter that is generally applied to a color display apparatus such as a liquid crystal display device or an organic light-emitting display apparatus.

The additional filter 2500 may include a wideband filter. In this case, the first to third additional filter units 2501, 2502, and 2503 may be first, second, and third wideband filter units, respectively. Each of the wideband filter units may have, for example, a multi-cavity structure or a metal mirror structure.

Figure 38:
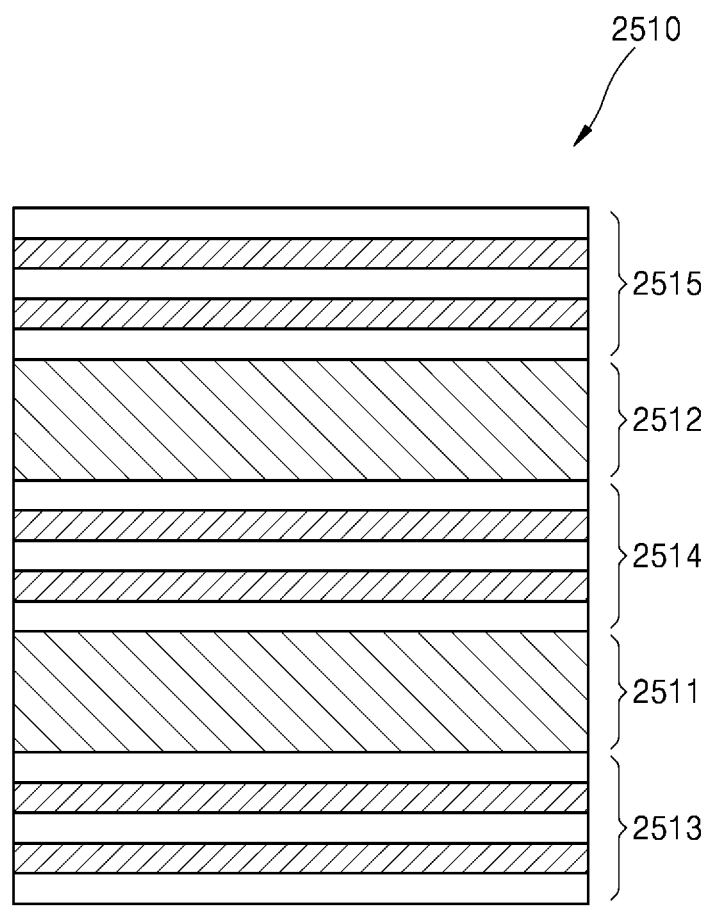
FIG. 38 is a diagram showing an example of a wideband filter that may be used as an additional filter of FIG. 37.

FIG. 38 is a diagram showing an example of a wideband filter that may be used as the additional filter 2500 of FIG. 37. FIG. 38 shows one wideband filter unit 2510 included in the wideband filter.

Referring to FIG. 38, the wideband filter unit 2510 may include a plurality of reflective layers 2513, 2514, and 2515, and a plurality of cavities 2511 and 2512 among the reflective layers 2513, 2514, and 2515. FIG. 38 shows three reflective layers 2513, 2514, and 2515 and two cavities 2511 and 2512 as an example, but one or more embodiments are not limited thereto, and the number of the reflective layers 2513, 2514, and 2515 and the number of cavities 2511 and 2512 may vary.

The first, second, and third reflective layers 2513, 2514, and 2515 are spaced apart from one another, the first cavity 2511 is between the first and second reflective layers 2513 and 2514 and the second cavity 2512 is between the second and third reflective layers 2514 and 2515.

Each of the first and second cavities 2511 and 2512 may have a material having a certain refractive index. Also, each of the first and second cavities 2511 and 2512 may include two or more materials having different refractive indices from each other.

Each of the first to third reflective layers 2513, 2514, and 2515 may be a Bragg reflective layer. Each of the first to third reflective layers 2513, 2514, and 2515 may have, for example, a structure in which a plurality of material layers having different refractive indices from one another are alternately stacked.

Figure 39:
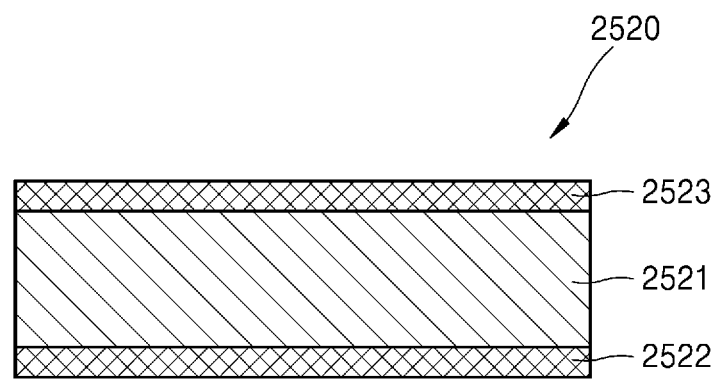
FIG. 39 is a diagram showing another example of a wideband filter that may be used as an additional filter of FIG. 37.

FIG. 39 is a diagram showing another example of a wideband filter that may be used as the additional filter 2500 of FIG. 37. FIG. 39 shows one wideband filter unit 2520 included in the wideband filter.

Referring to FIG. 39, the wideband filter unit 2520 may include first and second metal mirror layers 2522 and 2523 and a cavity 2521 between the first and second metal mirror layers 2522 and 2523.

Figure 40:
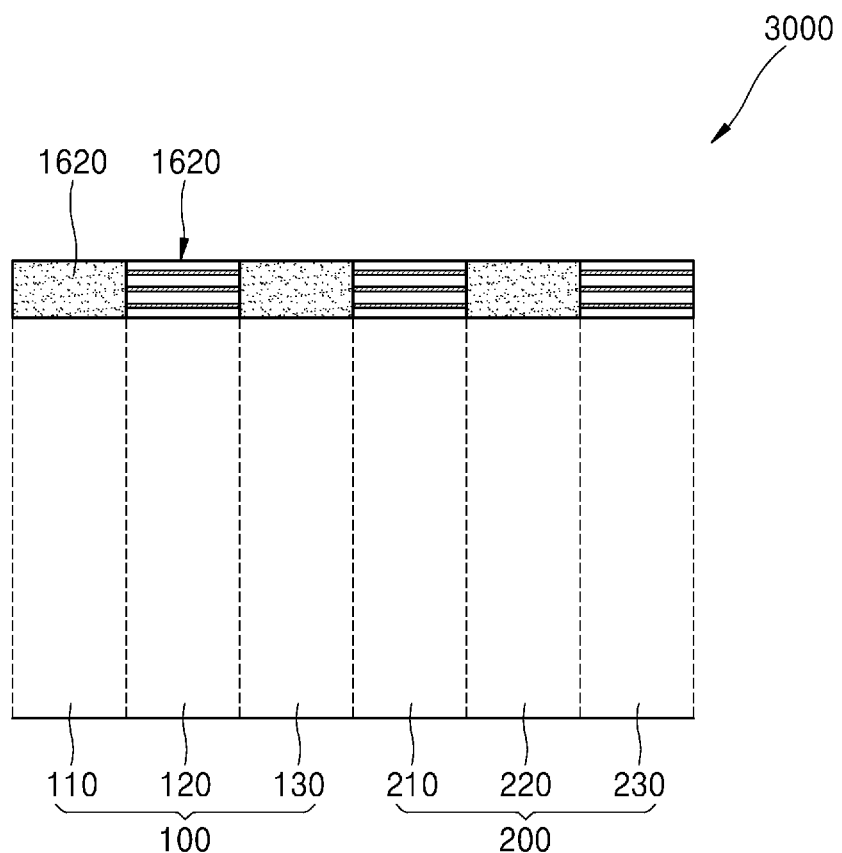
FIG. 40 is a cross-sectional view of an optical filter according to another example embodiment.

FIG. 40 is a cross-sectional view of an optical filter 3000 according to another example embodiment.

Referring to FIG. 40, the optical filter 300 includes a plurality of filter units 110, 120, 130, 210, 220, and 230, and a short-wavelength absorption filter 1610 and a long-wavelength block filter 1620 on the plurality of filter units 110, 120, 130, 210, 220, and 230. According to the illustration in FIG. 40, the first, second, and third filter units 110, 120, and 130 of the first filter group 100, and the fourth, fifth, and sixth filter units 210, 220, and 230 of the second filter group 200 as described above for convenience of description, however the disclosure is not limited thereto.

The short-wavelength absorption filter 1610 is provided on some (110, 130, and 220) of the first to sixth filter units 110, 120, 130, 210, 220, and 230, and the long-wavelength absorption filter 1620 may be provided on the other (120, 210, and 230) of the first to sixth filter units 110, 120, 130, 210, 220, and 230. FIG. 40 shows an example, in which each of the short-wavelength absorption filter 1610 and the long-wavelength block filter 1620 corresponds to one of the filter units 110, 120, 130, 210, 220, and 230, but one or more embodiments are not limited thereto, and each of the short-wavelength absorption filter 1610 and the long-wavelength block filter 1620 may correspond to two or more of the filter units 110, 120, 130, 210, 220, and 230.

The short-wavelength absorption filter 1610 may block, for example, the light of short-wavelength such as visible light. The short-wavelength absorption filter 1610 may be manufactured by depositing a material that may absorb the visible light, e.g., silicon, on some (110, 130, and 220) of the filter units 110, 120, 130, 210, 220, and 230. The filter units 110, 130, and 220 on which the short-wavelength absorption filter 1610 is provided may transmit near infrared ray (NIR) of a longer wavelength than that of the visible light.

The long-wavelength block filter 1620 may block, for example, the light of long wavelength such as NIR. The long-wavelength block filter 1620 may include an NIR cut-off filter. The filter units 120, 210, and 230 on which the long-wavelength block filter 1620 is provided may transmit the visible light having a shorter wavelength than that of the NIR.

According to the example embodiment, the short-wavelength absorption filter 1610 and the long-wavelength block filter 1620 are provided on the filter units 110, 120, 130, 210, 220, and 230, and thus, the optical filter 300 of wideband, that is, from the visible ray band to the NIR band, may be manufactured.

According to the example embodiments of the disclosure, the optical filter includes the plurality of filter units that may filter the different wavelength bands, and thus, the wideband characteristics may be improved. Also, because each of the plurality of filter units includes the multi-layer capable of blocking the light of an undesired wavelength band, the desired wavelength band may be implemented, and spectroscopic characteristics may be improved. Although the example embodiments have been described above, these are merely exemplary, and various modifications may be made therefrom by those of ordinary skill in the art.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. An optical filter comprising:
   at least one first filter element having a first center wavelength within a first wavelength band; and
   at least one second filter element arranged on a same plane as the at least one first filter element, the at least one second filter element having a second center wavelength within a second wavelength band,
   wherein each of the at least one first filter element comprises:
   a first bandpass filter including a plurality of first Bragg reflective layers and at least one first cavity provided between the plurality of first Bragg reflective layers; and
   a first multi-layer provided on the first bandpass filter, the first multi-layer having a different center wavelength than the first center wavelength of the plurality of first Bragg reflective layers to block light of other wavelength bands than the first wavelength band,
   wherein the first multi-layer comprises a plurality of material layers provided above an upper most Bragg reflective layer among the plurality of first Bragg reflective layers.

2. The optical filter of claim 1, wherein each of the plurality of first Bragg reflective layers and the first multi-layer has a structure, in which a plurality of material layers having different refractive indices from one another are alternately stacked,
   wherein each of the plurality of material layers in the first multi-layer have a first thickness and is made of a first material, and
   wherein at least one of the first thickness or the first material is different from a second thickness or a second material of each of the plurality of material layers of the plurality of first Bragg reflective layers.

3. The optical filter of claim 2, wherein the first multi-layer includes a third Bragg reflective layer including material layers having identical optical thicknesses.

4. The optical filter of claim 2, wherein the first multi-layer includes a first pass filter including material layers, at least some of which have different optical thicknesses.

5. The optical filter of claim 4, wherein the first pass filter includes a shortpass filter.

6. The optical filter of claim 2, wherein the first center wavelength of the first bandpass filter is adjusted by changing a thickness or an effective refractive index of the at least one first cavity.

7. The optical filter of claim 1, wherein the at least one second filter element comprises:
   a second bandpass filter including a plurality of second Bragg reflective layers and a second cavity between the plurality of second Bragg reflective layers; and
   a second multi-layer provided on the second bandpass filter, the second multi-layer having a different center wavelength than the second center wavelength of the plurality of second Bragg reflective layers to block light of other wavelength bands than the second wavelength band.

8. The optical filter of claim 7, wherein each of the plurality of second Bragg reflective layers and the second multi-layer has a structure, in which a plurality of material layers having different refractive indices from one another are alternately stacked,
   wherein the plurality of material layers in the second multi-layer have a third thickness and is made of a third material, and
   wherein at least one of the third thickness or the third material is different from a fourth thickness or a fourth material of each of the plurality of material layers of the plurality of second Bragg reflective layers.

9. The optical filter of claim 8, wherein the material layers in each of the second Bragg reflective layers are same as the material layers in the first multi-layer, and the material layers in the second multi-layer are same as material layers in each of the first Bragg reflective layers.

10. The optical filter of claim 8, wherein the second multi-layer includes a fourth Bragg reflective layer including material layers having identical optical thicknesses.

11. The optical filter of claim 8, wherein the second multi-layer includes a second pass filter including material layers, at least some of which have different optical thicknesses.

12. The optical filter of claim 11, wherein the second pass filter includes a longpass filter.

13. The optical filter of claim 7, wherein the second center wavelength of the second bandpass filter is adjusted by changing a thickness or an effective refractive index of the second cavity.

14. The optical filter of claim 1, wherein the at least one second filter element comprises a second bandpass filter that includes a plurality of second Bragg reflective layers including a material absorbing the light of the first wavelength band and a cavity provided between the plurality of second Bragg reflective layers.

15. The optical filter of claim 1, further comprising at least one third filter element arranged on a same plane as the at least one first filter element and the at least one second filter element, wherein the at least one third filter element has a third center wavelength between the first wavelength band and the second wavelength band.

16. The optical filter of claim 1, further comprising an additional filter provided on the at least one first filter element and the at least one second filter element to only transmit a certain wavelength band.

17. The optical filter of claim 16, wherein the additional filter comprises a color filter or a wideband filter.

18. The optical filter of claim 1, wherein a short-wavelength absorption filter is provided on some of the at least one first filter element and the at least one second filter element and a long-wavelength block filter is provided on some of the other of the at least one first filter element and the at least one second filter element.

19. An optical filter comprising:
   a plurality of filter elements arranged on a same plane, the plurality of filter elements having center wavelengths in different wavelength bands,
   wherein each of the plurality of filter elements comprises:
      a plurality of material layers having refractive indices different from one another; and
      a cavity provided between the plurality of material layers,
      wherein the plurality of material layers have gradually increasing thicknesses in a first direction,
   wherein the plurality of material layers comprise:
      a first material layer having a first thickness provided below the cavity, and
      a second material layer having a second thickness provided above the cavity, the second thickness being greater than the first thickness.

20. The optical filter of claim 19, wherein the center wavelengths of the plurality of filter elements are adjusted by changing a location of the cavity of the respective one of the plurality of filter elements.

21. A spectrometer comprising:
   an optical filter; and
   a sensing device receiving light transmitted through the optical filter,
   wherein the optical filter comprises:
      at least one first filter element having a first center wavelength within a first wavelength band; and
      at least one second filter element arranged on a same plane as the at least one first filter element, the at least one second filter element having a second center wavelength within a second wavelength band,
      wherein the at least one first filter element comprises:
         a first bandpass filter including a plurality of first Bragg reflective layers and at least one first cavity provided between the plurality of first Bragg reflective layers; and
         a first multi-layer provided on the first bandpass filter, the first multi-layer having a different center wavelength than the first center wavelength of the plurality of first Bragg reflective layers to block light of other wavelength bands than the first wavelength band, wherein the first multi-layer comprises a plurality of material layers provided above an upper most Bragg reflective layer among the plurality of first Bragg reflective layers.

22. The spectrometer of claim 21, wherein each of the plurality of first Bragg reflective layers and the first multi-layer has a structure, in which a plurality of material layers having different refractive indices from one another are alternately stacked,
wherein each of the plurality of material layers in the first multi-layer have a first thickness and is made of a first material, and
wherein at least one of the first thickness or the first material is different from a second thickness or a second material of each of the plurality of material layers of the plurality of first Bragg reflective layers.

23. The spectrometer of claim 22, wherein the first multi-layer includes a third Bragg reflective layer including material layers having identical optical thicknesses.

24. The spectrometer of claim 22, wherein the first multi-layer includes a first pass filter including material layers, at least some of which have different optical thicknesses.

25. The spectrometer of claim 22, wherein the first center wavelength of the first bandpass filter is adjusted by changing a thickness or an effective refractive index of the at least one first cavity.

26. The spectrometer of claim 21, wherein the at least one second filter element comprises:
a second bandpass filter including a plurality of second Bragg reflective layers and a second cavity between the plurality of second Bragg reflective layers; and
a second multi-layer provided on the second bandpass filter, the second multi-layer having a different center wavelength than the second center wavelength of the plurality of second Bragg reflective layers to block light of other wavelength bands than the second wavelength band.

27. The spectrometer of claim 26, wherein each of the plurality of second Bragg reflective layers and the second multi-layer has a structure, in which a plurality of material layers having different refractive indices from one another are alternately stacked,
wherein the plurality of material layers in the second multi-layer have a third thickness and is made of a third material, and
wherein at least one of the third thickness or the third material is different from a fourth thickness or a fourth material of each of the plurality of material layers of the plurality of second Bragg reflective layers.

28. The spectrometer of claim 27, wherein the second multi-layer includes a fourth Bragg reflective layer including material layers having identical optical thicknesses.

29. The spectrometer of claim 27, wherein the second multi-layer includes a first pass filter including material layers, at least some of which have different optical thicknesses.

30. The spectrometer of claim 27, wherein the second center wavelength of the second bandpass filter is adjusted by changing a thickness or an effective refractive index of the second cavity.

31. The spectrometer of claim 21, wherein the at least one second filter element comprises a second bandpass filter that includes a plurality of second Bragg reflective layers including a material absorbing the light of the first wavelength band and a cavity provided between the plurality of second Bragg reflective layers.

32. The spectrometer of claim 21, wherein
the optical filter further comprises at least one third filter element arranged on a same plane as the at least one first filter element and the at least one second filter element, and
the at least one third filter element has a third center wavelength between the first wavelength band and the second wavelength band.

33. The spectrometer of claim 21, wherein the optical filter further comprises an additional filter provided on the at least one first filter element and the at least one second filter element to only transmit a certain wavelength band.

34. The spectrometer of claim 21, wherein a short-wavelength absorption filter is provided on some of the at least one first filter element and the at least one second filter element and a long-wavelength block filter is provided on some of the other of the at least one first filter element and the at least one second filter element.

35. An optical filter comprising:
a first bandpass filter having a first center wavelength within a first wavelength band, the first bandpass filter including a plurality of first Bragg reflective layers and at least one first cavity provided between the plurality of first Bragg reflective layers;
a first multi-layer provided on the first bandpass filter, the first multi-layer having a plurality of first material layers configured to block light of wavelength bands different from the first wavelength band;
a second bandpass filter having a second center wavelength within a second wavelength band, the second bandpass filter including a plurality of second Bragg reflective layers and at least one second cavity provided between the plurality of second Bragg reflective layers; and
a second multi-layer provided on the second bandpass filter, the second multi-layer having a plurality of second material layers configured to block light of wavelength bands different from the second wavelength band,
wherein the first bandpass filter and the first multi-layer are provided on a same plane as the second bandpass filter and the second multi-layer, and
wherein the first multi-layer comprises a plurality of material layers provided above an upper most Bragg reflective layer among the plurality of first Bragg reflective layers.

36. An optical filter comprising:
a first filter group comprising:
a plurality of first bandpass filters; and
a plurality of first multi-layers provided on the plurality of first bandpass filters; and
a second filter group comprising:
a plurality of second bandpass filters; and
a plurality of second multi-layers provided on the second bandpass filters,
wherein the plurality of first bandpass filters comprises:
a first first bandpass filter having a first center wavelength within a first wavelength band, and
a second first bandpass filter having a second center wavelength within a second wavelength band, and
wherein the plurality of first multi-layers is configured to block light of wavelength bands different from the first wavelength band,
wherein the first multi-layer comprises a plurality of material layers provided above an upper most Bragg reflective layer among a plurality of first Bragg reflective layers.

* * * * *